United States Patent
Yeh et al.

(10) Patent No.: US 9,019,668 B2
(45) Date of Patent: Apr. 28, 2015

(54) INTEGRATED CIRCUIT HAVING A CHARGED-DEVICE MODEL ELECTROSTATIC DISCHARGE PROTECTION MECHANISM

(71) Applicant: Industrial Technology Research Institute, Hsinchu (TW)

(72) Inventors: Chih Ting Yeh, Hsinchu County (TW); Yung Chih Liang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 54 days.

(21) Appl. No.: 13/718,984

(22) Filed: Dec. 18, 2012

(65) Prior Publication Data

US 2013/0170082 A1    Jul. 4, 2013

(30) Foreign Application Priority Data

Dec. 30, 2011 (TW) ............... 100150091 A

(51) Int. Cl.
| | |
|---|---|
| H02H 9/00 | (2006.01) |
| H02H 9/04 | (2006.01) |
| H02H 1/00 | (2006.01) |
| H02H 1/04 | (2006.01) |
| H02H 3/22 | (2006.01) |
| H02H 9/06 | (2006.01) |

(52) U.S. Cl.
CPC .................... *H02H 9/046* (2013.01)

(58) Field of Classification Search
CPC ....... H02H 9/04; H01L 27/0248; H01L 27/60
USPC .......................................................... 361/56
See application file for complete search history.

(56) References Cited

U.S. PATENT DOCUMENTS

| | | | |
|---|---|---|---|
| 5,644,167 A | 7/1997 | Weiler et al. | |
| 5,807,791 A | 9/1998 | Bertin et al. | |
| 6,198,136 B1 | 3/2001 | Voldman et al. | |
| 6,303,996 B2 | 10/2001 | Lin | |
| 6,370,029 B1 | 4/2002 | Kawan | |
| 6,617,649 B2* | 9/2003 | Chang et al. | 257/355 |
| 7,110,228 B2* | 9/2006 | Chang | 361/56 |
| 7,808,075 B1 | 10/2010 | Cheng et al. | |

(Continued)

FOREIGN PATENT DOCUMENTS

| | | |
|---|---|---|
| CN | 1362742 | 8/2002 |
| CN | 101689543 | 3/2010 |

OTHER PUBLICATIONS

Jian-Hsing Lee et al.,"The study of sensitive circuit and layout for CDM improvement," IEEE Proceeding of 16th IPFA, 2009, pp. 228-232.

(Continued)

*Primary Examiner* — Dharti Patel
(74) *Attorney, Agent, or Firm* — WPAT, P.C.; Anthony King

(57) ABSTRACT

An integrated circuit having charged-device model (CDM) electrostatic discharge (ESD) protection includes an I/O circuit, at least one CDM ESD protection device, and at least one internal circuit. The integrated circuit further includes at least one TSV (Through Silicon Via) each being coupled between a ground of at least one ground of the input/output circuit and one of the at least one ESD protection device, wherein each of the at least one ESD protection device is coupled between one of the at least one TSV and a ground of one of the at least one internal circuit.

30 Claims, 20 Drawing Sheets

(56) References Cited

U.S. PATENT DOCUMENTS

| | | |
|---|---|---|
| 7,868,463 B2 | 1/2011 | Lin |
| 7,883,947 B1 | 2/2011 | Cheng et al. |
| 7,923,848 B2 | 4/2011 | Lin |
| 2005/0286186 A1 | 12/2005 | Chang |
| 2010/0258949 A1 | 10/2010 | Henderson et al. |

OTHER PUBLICATIONS

Ming-Dou Ker et al., "EDS protection design to overcome internal damages on interface circuits of CMOS IC with multiple separated power pins," in Proc. IEEE International ASIC/SOC Conf., 2002, pp. 234-238.

Markus Mergens et al., "Active-source-pump (ASP) technique for ESD design window expansion and ultra-thin gate oxide protection in sub-90nm technologies," in Proc. Custom Integrated Circuits Conf., 2004, pp. 251-254.

Shihohung Chen et al., "Active ESD protection circuit design against charged-device-model ESD event in CMOS integrated circuits," Journal of Microelectronics Reliability, Sep. 2007, vol. 47, No. 9-11, pp. 1502-1505.

Chun-Yu Lin et al., "CDM ESD protection design with initial-on concept in nanoscale CMOS process," in Proc. IEEE International Physical and Failure Analysis of Integrated Circuits Symp., 2010, pp. 1-4.

Office Action and Search Report issued on Feb. 2, 2015 by SIPO for the counterpart CN Patent Application No. 201210587481.1.

\* cited by examiner

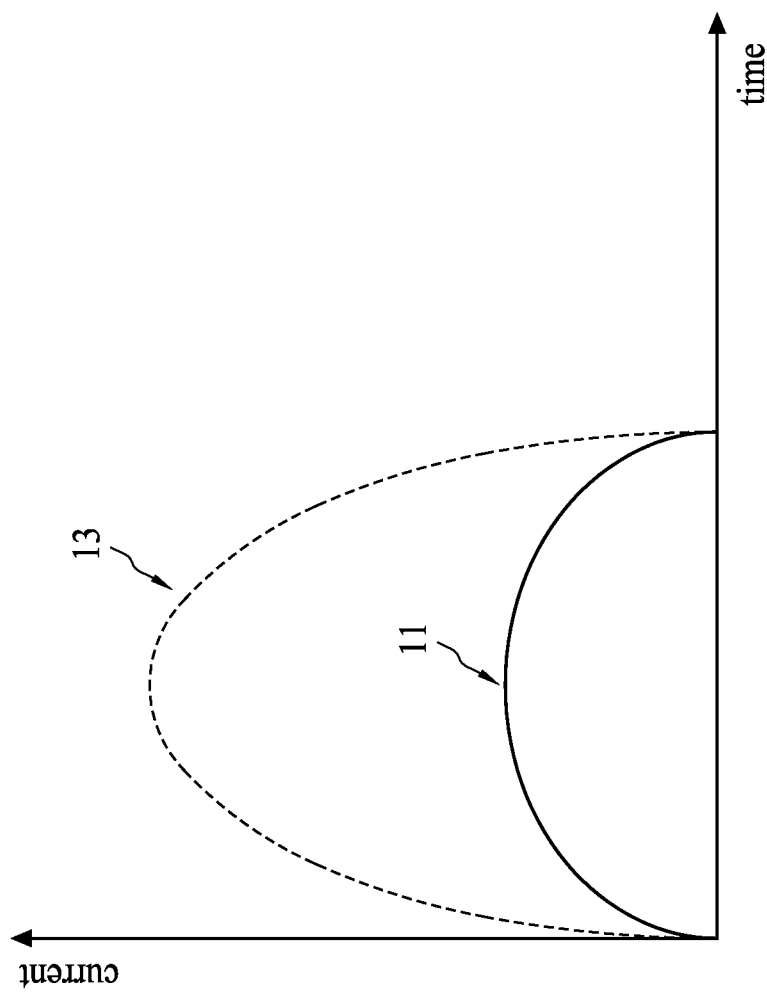

US 9,019,668 B2

INTEGRATED CIRCUIT HAVING A CHARGED-DEVICE MODEL ELECTROSTATIC DISCHARGE PROTECTION MECHANISM

CROSS REFERRENCE TO RELATED APPLICATION

The present application claims priority from Taiwanese application Ser. No. 100150091, filed on Dec. 30, 2011, of the same title and inventorship herewith.

TECHNICAL FIELD

The present disclosure generally relates to an integrated circuit having a charged-device model electrostatic discharge protection.

BACKGROUND

Metal traces and through silicon vias (TSVs) are used to connect with the stacks each other in a stacked integrated circuit (IC). When a charged-device model (CDM) electrostatic discharge (ESD) event occurs on the stacked IC, accumulated charge in each stack will be discharged via the TSVs and the metal traces of each stack in the stacked IC. However, accumulated charge in each stack may be easily liable to generate an excessive current due to simultaneous discharge when the CDM ESD event occurs on the stacked IC.

FIG. 1 illustrates schematic waveforms of electrostatic discharge currents in a stacked integrated circuit. As shown in FIG. 1, waveform 11 represents a discharge current of accumulated charge in a stack of the stacked IC, while waveform 13 represents a total discharge current which is a sum of discharge currents discharging substantially at the same time from stacks of the stacked IC.

During a CDM ESD event, accumulated charge may be discharged in a discharge current at a certain time point, with a considerably high current peak in a relatively short period.

The damage caused by CDM ESD to components of an input/output circuit could be reduced by providing CDM ESD protection for a stacked IC.

SUMMARY

Embodiments of the present disclosure disclose an integrated circuit having CDM ESD protection, comprising an input/output circuit and at least one ESD protection device coupled between at least one ground of the input/output circuit and a ground of at least one internal circuit.

Embodiments of the present disclosure also disclose an integrated circuit having CDM ESD protection, comprising an input/output circuit, at least one ESD protection device, and at least one through silicon via (TSV) each being coupled between a ground of the input/output circuit and one of the at least one ESD protection device, wherein each of the at least one ESD protection device is coupled between one of the at least one TSV and a ground of one of at least one internal circuit.

Embodiments of the present disclosure further disclose an integrated circuit having CDM ESD protection, comprising a first circuit, a second circuit and a third circuit. The first circuit has a first terminal, a second terminal and a third terminal, wherein the first terminal of the first circuit is coupled to a power source, the second terminal of the first circuit is coupled to a first ground of an input/output circuit or an internal circuit, and the third terminal of the first circuit is coupled to a second ground of another internal circuit.

The second circuit has a first terminal, a second terminal and a third terminal, wherein the first terminal of the second circuit is coupled to the power source, the second terminal of the second circuit is coupled to the second ground, and the third terminal of the second circuit is coupled to the first ground. The third circuit has a first terminal, a second terminal and a third terminal, wherein the third terminal of the third circuit is coupled to the power source, the second terminal of the third circuit is coupled to the second ground, and the first terminal of the third circuit is coupled to the first ground.

Embodiment of the present disclosure also disclose an integrated circuit having a CDM ESD protection, comprising a substrate, at least one first transistor in the substrate including a first doped region of a first dopant type, and a second doped region of the first dopant type, wherein one of the first doped region of the first dopant type and the second doped region of the first dopant type is in electrical connection with a first ground of an input/output circuit or an internal circuit, and the other one of the first doped region of the first dopant type and the second doped region of the first dopant type is in electrical connection with a second ground of another internal circuit, and a first doped region of a second dopant type in the substrate in electrical connection with one of the first ground and the second ground, wherein at least one transistor is turned on during normal operation, and wherein the at least one transistor is turned off and provides a parasitic dual-directional conduction, during a CDM ESD event, for discharging accumulated charge.

DRAWINGS

FIG. 5-1 is a schematic view of yet another embodiment of the present disclosure showing an integrated circuit having CDM ESD protection;

FIG. 5-2 is a schematic view of still another embodiment of the present disclosure showing an integrated circuit having CDM ESD protection;

DETAILED DESCRIPTION

The present disclosure provides an integrated circuit having CDM ESD protection for gradual discharge of electric charge accumulated in an internal circuit.

Figure 2:
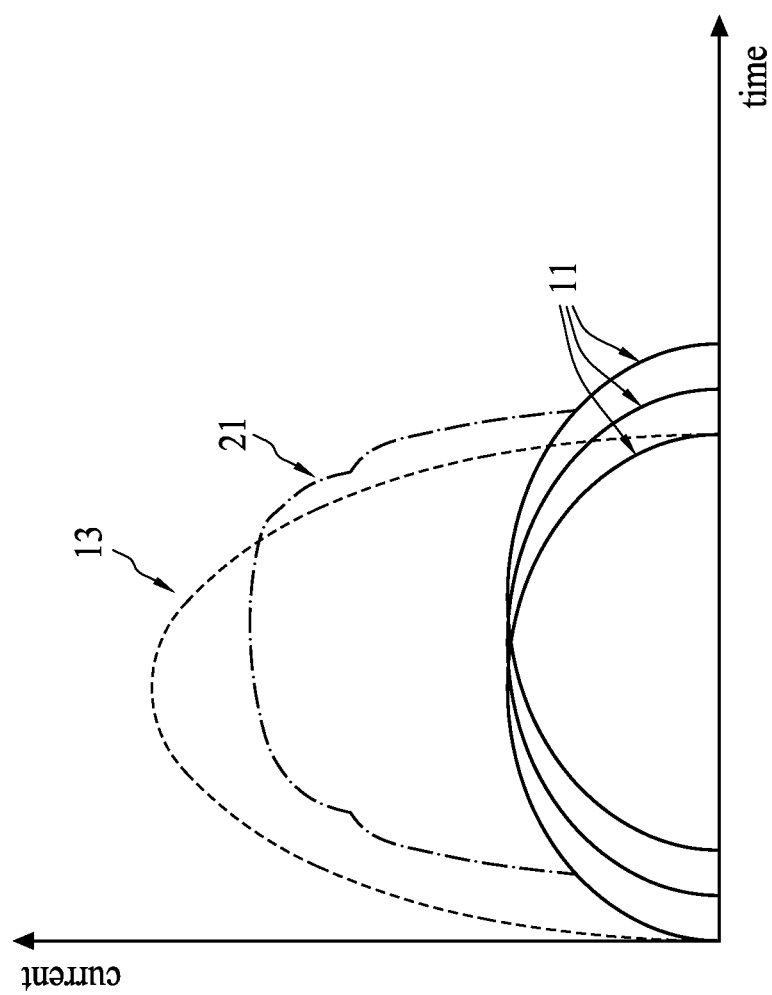
FIG. 2 illustrates schematic waveforms of electrostatic discharge currents in a stacked integrated circuit having CDM ESD protection in accordance with one embodiment of the present disclosure.

FIG. 2 illustrates schematic waveforms of electrostatic discharge currents in an integrated circuit having CDM ESD protection. The integrated circuit includes a plurality of stacks. As shown in FIG. 2, each of waveforms 11 represents an electrostatic discharge current resulting from electric charge accumulated in one of the plurality of stacks.

Moreover, waveform 13 represents a total discharge current, which is a sum of electrostatic discharge currents substantially simultaneously discharged from the plurality of stacks. Furthermore, waveform 21 represents an electrostatic discharge current in an integrated circuit having CDM ESD protection.

As indicated by the waveform 21, it is possible to prevent an input/output circuit of an integrated circuit with CDM ESD protection from damage caused by an ESD current during an ESD event by reducing the peak value of the ESD current while extending the discharge time of accumulated charge that contributes to the ESD current.

Figure 3:
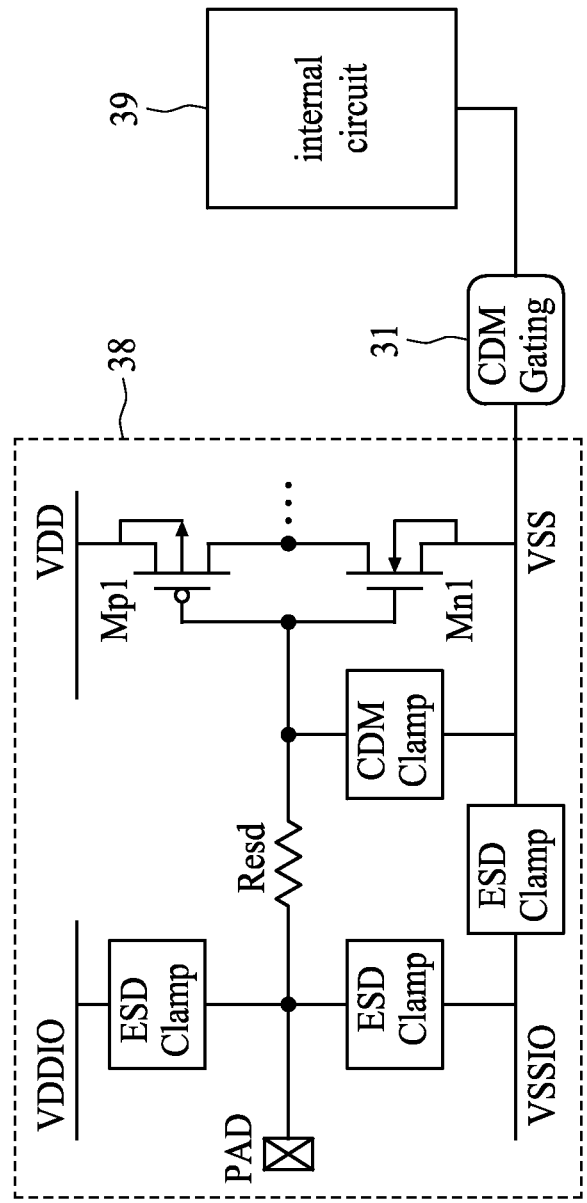
FIG. 3 is a schematic view of one embodiment of the present disclosure showing an integrated circuit having CDM ESD protection.

FIG. 3 is a schematic view of one embodiment of the present disclosure showing an integrated circuit 30 having CDM ESD protection. As shown in FIG. 3, the integrated circuit 30 includes an input/output circuit 38, a CDM ESD protection device 31, or "CDM Gating," and an internal circuit 39. The input/output circuit 38 may function to transmit signals between a pad and internal circuits of the integrated circuit 30, and may include ESD clamps (not numbered) to suppress ESD stress.

The input/output circuit 38 may take other forms or arrangements and thus are not limited to the exemplary one as illustrated. The CDM ESD protection device 31 is coupled between a first ground. i.e., a first voltage reference or a ground level, VSS or VSSIO, of the input/output circuit 38 and a second ground, i.e., a second voltage reference or a ground level of the internal circuit 39.

The CDM ESD device 31 includes a gateway circuit, which serves as a conducting path that exhibits a low resistance during normal operation of the integrated circuit 30. The resistance of the conducting path may be determined by the magnitude of current needed by the internal circuit 39. For example, in the case that the current needed by the internal circuit 39 is approximately 100 milli-amperes (mA) and a cross voltage of approximately 10 milli-volts (mV) is allowed in the gateway circuit, the resistance may be determined as 0.1 ohm ($\Omega$) and the size of the gateway circuit may be determined accordingly.

To protect the integrated circuit 30 from a CDM ESD event, the gateway circuit is designed with a conducting voltage, which is smaller than a gate breakdown voltage or a junction breakdown voltage of an internal component of the gateway circuit. When the cross voltage between two terminals of the gateway circuit is greater than the conducting voltage, electric charge accumulated in the internal circuit 39 may be discharged via the gateway circuit.

For example, when the gate breakdown voltage of the internal component is 3V, a maximum of the conducting voltage may be smaller than 3V. If the internal component of the conducting path is a diode, the conducting voltage is approximately 0.7V.

Moreover, the CDM ESD protection device 31 may provide a dual-directional conducting path, and is configured to gradually discharge electric charge accumulated in the internal circuit 39 to the input/output circuit 38 so as prevent the input/output circuit 38 from damage caused by an excessive current from the internal circuit 39 during a CDM ESD event.

The electric charge may be positive or negative, but in either case the electric charge can be discharged because the conducting path can operate in either direction. The CDM ESD protection device 31 will be discussed in detail by reference to FIGS. 7 to 9 in later paragraphs.

Figure 4:
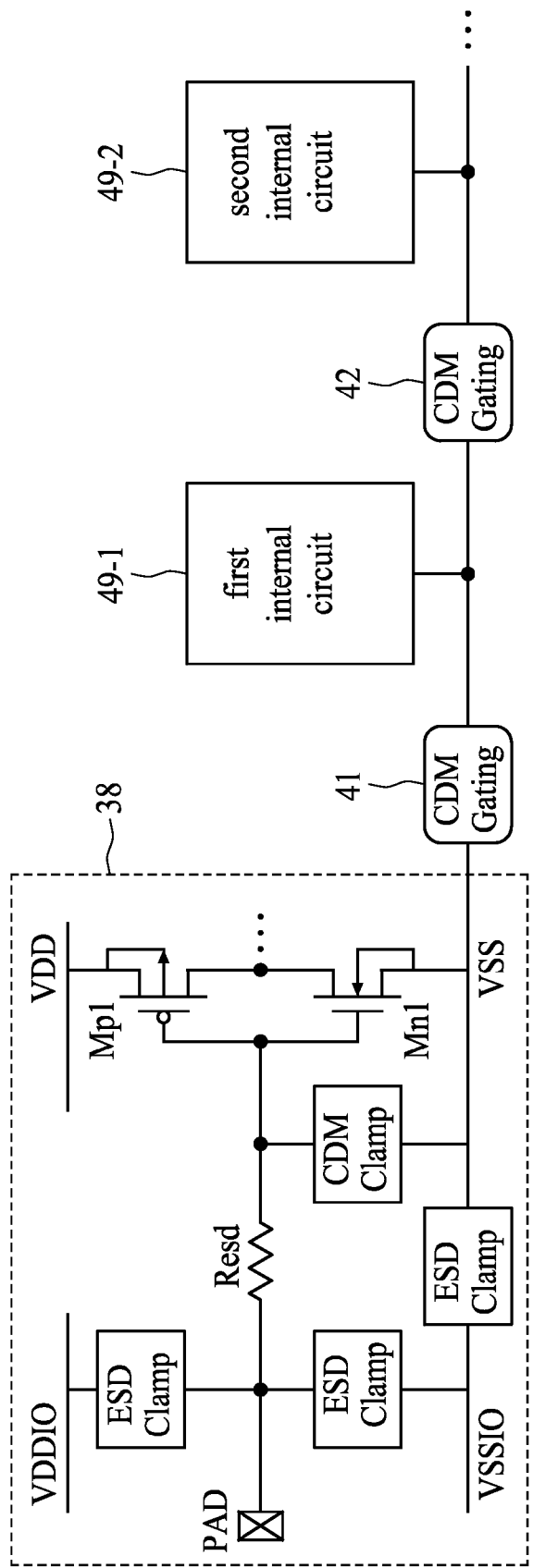
FIG. 4 is a schematic view of another embodiment of the present disclosure showing an integrated circuit having CDM ESD protection.

FIG. 4 is a schematic view of another embodiment of the present disclosure showing an integrated circuit 40 having CDM ESD protection. As shown in FIG. 4, the integrated circuit 40 includes a first internal circuit 49-1, a first CDM ESD protection device 41, a second internal circuit 49-2 and a second CDM ESD protection device 42 as well as the input/output circuit 38. The first CDM ESD protection device 41, like the CDM ESD protection device 31 illustrated in FIG. 3, is coupled between a ground level, VSS or VSSIO, of the input/output circuit 38 and a ground level of the first internal circuit 49-1.

Moreover, the second CDM ESD protection device 42 is coupled between the ground level of the first internal circuit 49-1 and a ground level of the second internal circuit 49-2. Furthermore, each of the first CDM ESD protection device 41 and the second CDM ESD protection device 42 are similar to the CDM ESD protection device 31 illustrated in FIG. 3 and is not described.

Figure 5:
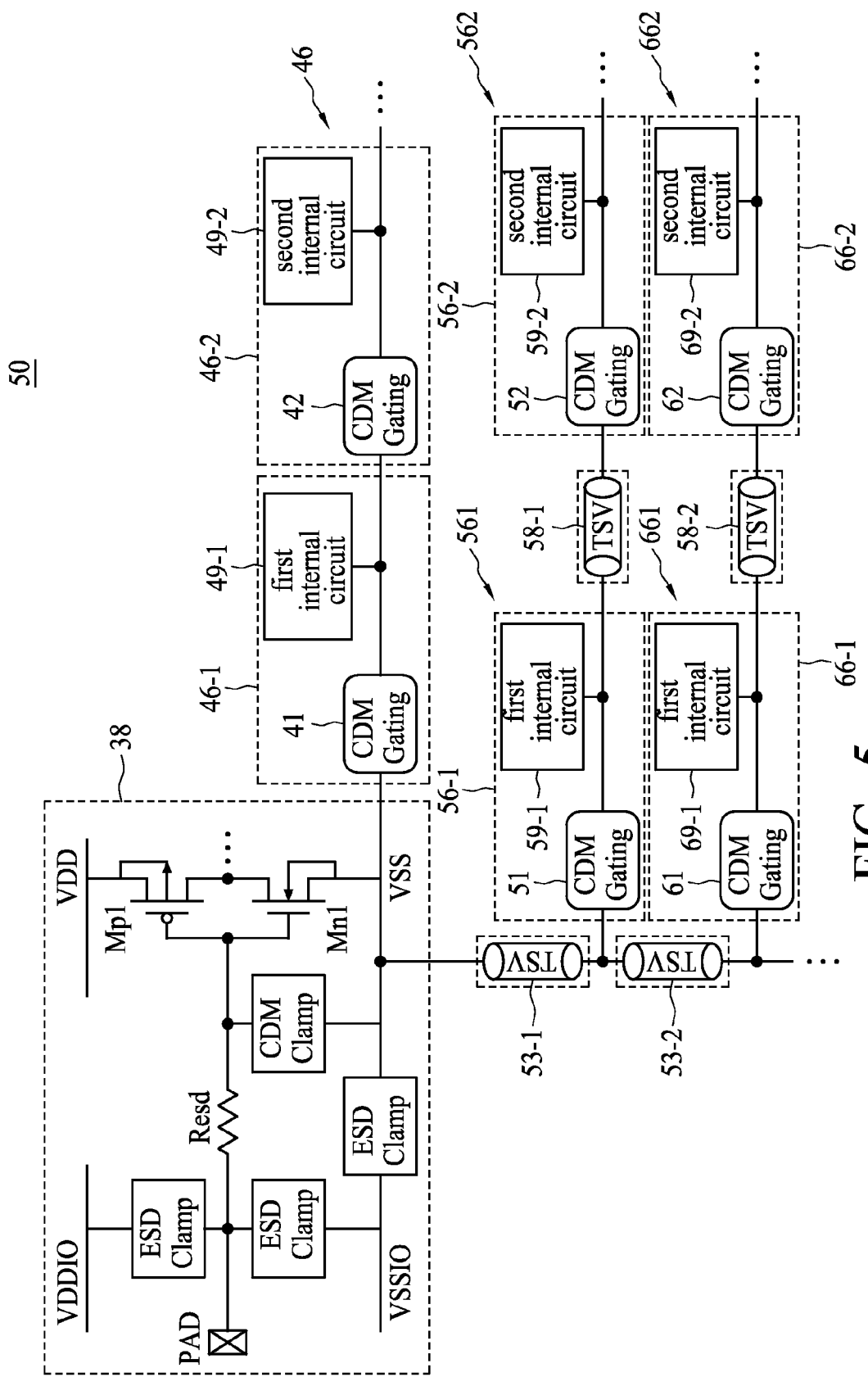
FIG. 5 is a schematic view of still another embodiment of the present disclosure showing an integrated circuit having CDM ESD protection.

FIG. 5 is a schematic view of still another embodiment of the present disclosure showing an integrated circuit 50 having CDM ESD protection. As shown in FIG. 5, the integrated circuit 50 is similar to the integrated circuit 40 illustrated in FIG. 4 except that, for example, the integrated circuit 50 further includes additional CDM ESD protection devices and internal circuits in other stacks. Specifically, the integrated circuit 50 may include several stacks 46, 561, 562, 661 and 662, and several through-silicon vias (TSVs) each coupled between two adjacent stacks.

In the present embodiment, five stacks and four TSVs are illustrated. However, the number of stacks and TSVs are exemplary only. In other embodiments, more or less number of stacks and TSVs may exist, depending on the situation.

Furthermore, for the purpose of convenience, TSV 58-1 coupled between the stacks 561 and 562, and TSV 58-2 coupled between the stacks 661 and 662 are illustrated as laterally disposed, even though actually they are vertically disposed between two stacks.

Each of the stacks 46, 561, 562, 661 and 662 may include at least one stage. In the present embodiment, the stack 46 includes a first stage 46-1 and a second stage 46-2. The first stage 46-1 further includes the first CDM ESD protection device 41 and the first internal circuit 49-1, while the second stage 46-2 further includes the second CDM ESD protection device 42 and the second internal circuit 49-2.

Furthermore, the stack 561 includes a stage 56-1 while the stack 562 includes a stage 56-2. The stage 56-1 further includes a first CDM ESD protection device 51 and a first internal circuit 59-1, while the stage 56-2 further includes a second CDM ESD protection device 52 and a second internal circuit 59-2. The first CDM ESD protection device 51 of the stage 56-1 at the stack 561 is coupled between the ground level, VSS or VSSIO, of the input/output circuit 38, via a TSV 53-1, and a ground level of the first internal circuit 59-1. Moreover, the second CDM ESD protection device 52 of the stage 56-2 at the stack 562 is coupled between the ground level of the first internal circuit 59-1, via the TSV 58-1, and a ground level of the second internal circuit 59-2.

Similarly, the stack 661 includes a stage 66-1 while the stack 662 includes a stage 66-2. The stage 66-1 further includes a first CDM ESD protection device 61 and a first internal circuit 69-1, while the stage 66-2 further includes a second CDM ESD protection device 62 and a second internal circuit 69-2.

The first CDM ESD protection device 61 of the stage 66-1 at the stack 661 is coupled between the ground level of the input/output circuit 38, via a TSV 53-2, and a ground level of the first internal circuit 69-1. Moreover, the second CDM ESD protection device 62 of the stage 66-2 at the stack 662 is coupled between the ground level of the first internal circuit 69-1, via the TSV 58-2, and a ground level of the second internal circuit 69-2.

Figures 1, 5:
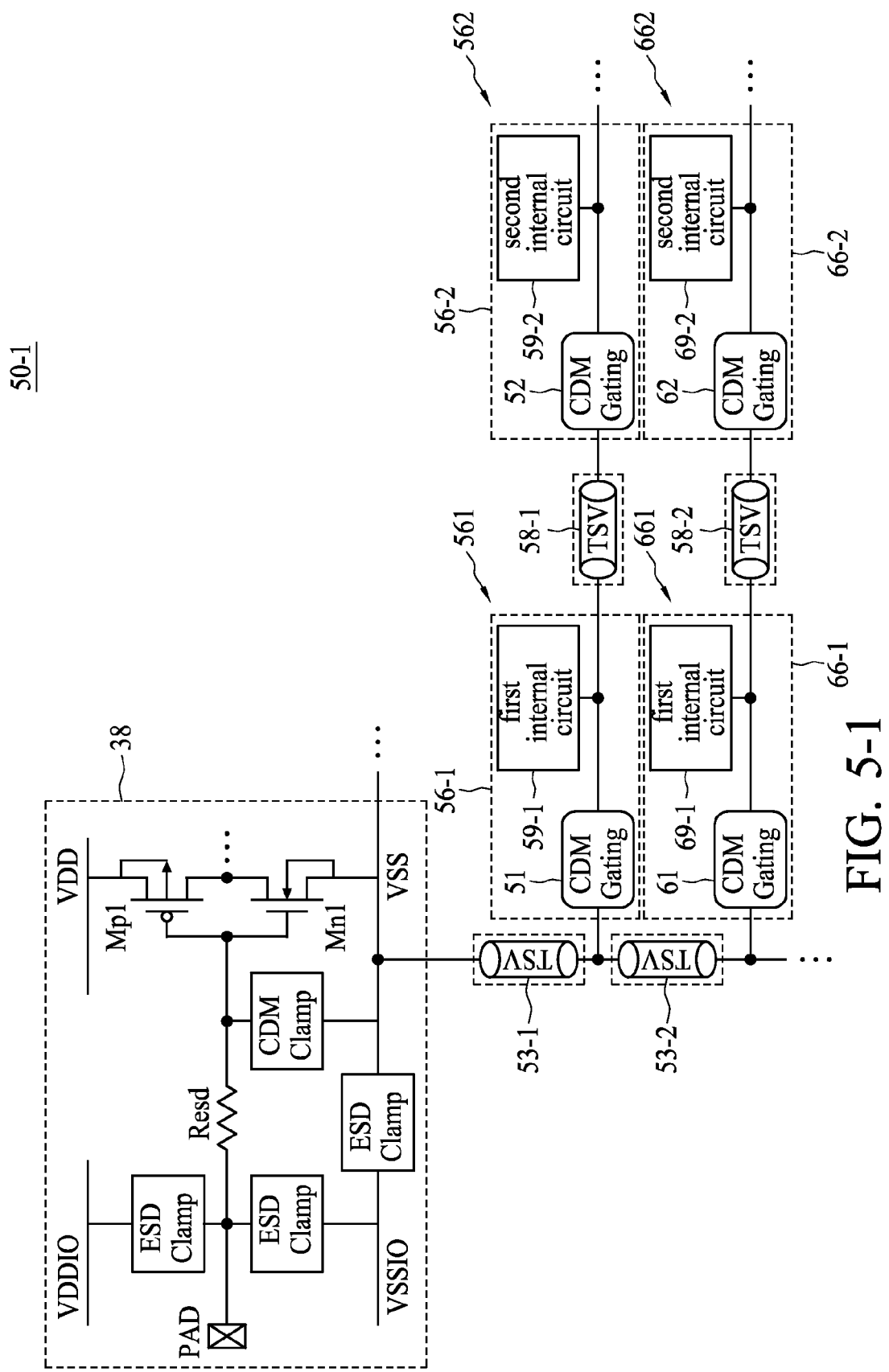
FIG. 1 illustrates schematic waveforms of electrostatic discharge currents in a stacked integrated circuit.
Figures 2, 5:
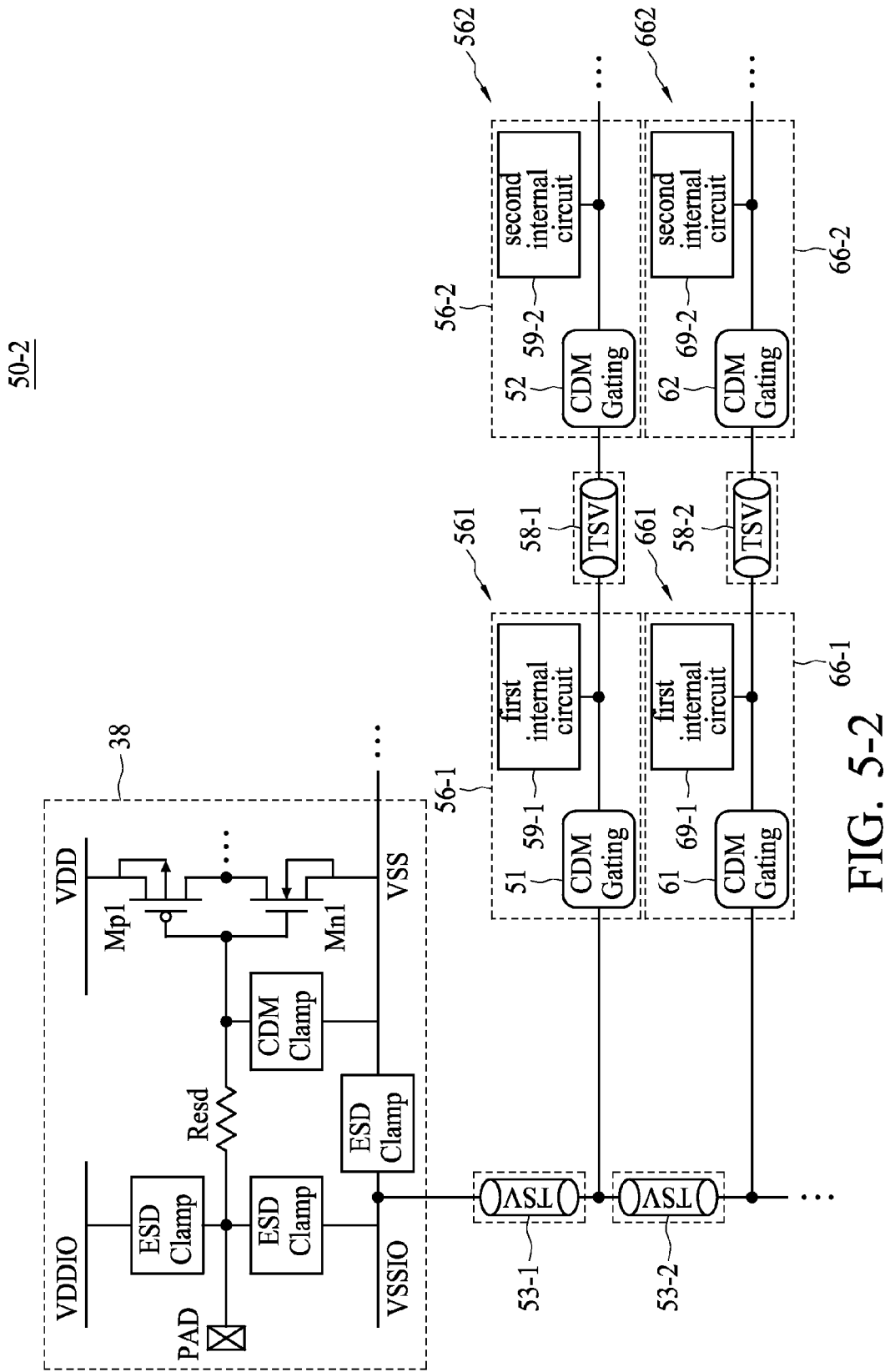

FIG. 5-1 is a schematic view of yet another embodiment of the present disclosure showing an integrated circuit 50-1 having CDM ESD protection. Referring to FIG. 5-1, the integrated circuit 50-1 may be similar to the integrated circuit 50 illustrated in FIG. 5 except that, for example, the first stage 46-1 and the second stage 46-2 at the stack 46 are absent.

FIG. 5-2 is a schematic view of still another embodiment of the present disclosure showing an integrated circuit 50-2 having CDM ESD protection. Referring to FIG. 5-2, the integrated circuit 50-2 may be similar to the integrated circuit 50-1 illustrated in FIG. 5-1 except that, for example, the TSV 53-1 is coupled to VSSIO. FIGS. 5, 5-1 and 5-2 thus have illustrated embodiments in which at least one ESD protection device is coupled between at least one ground of the input/output circuit and a ground of at least one internal circuit. Moreover, FIGS. 5, 5-1 and 5-2 have illustrated embodiments in which at least one TSV is coupled between a ground of the at least one ground of the input/output circuit and the at least one ESD protection device.

Figure 6:
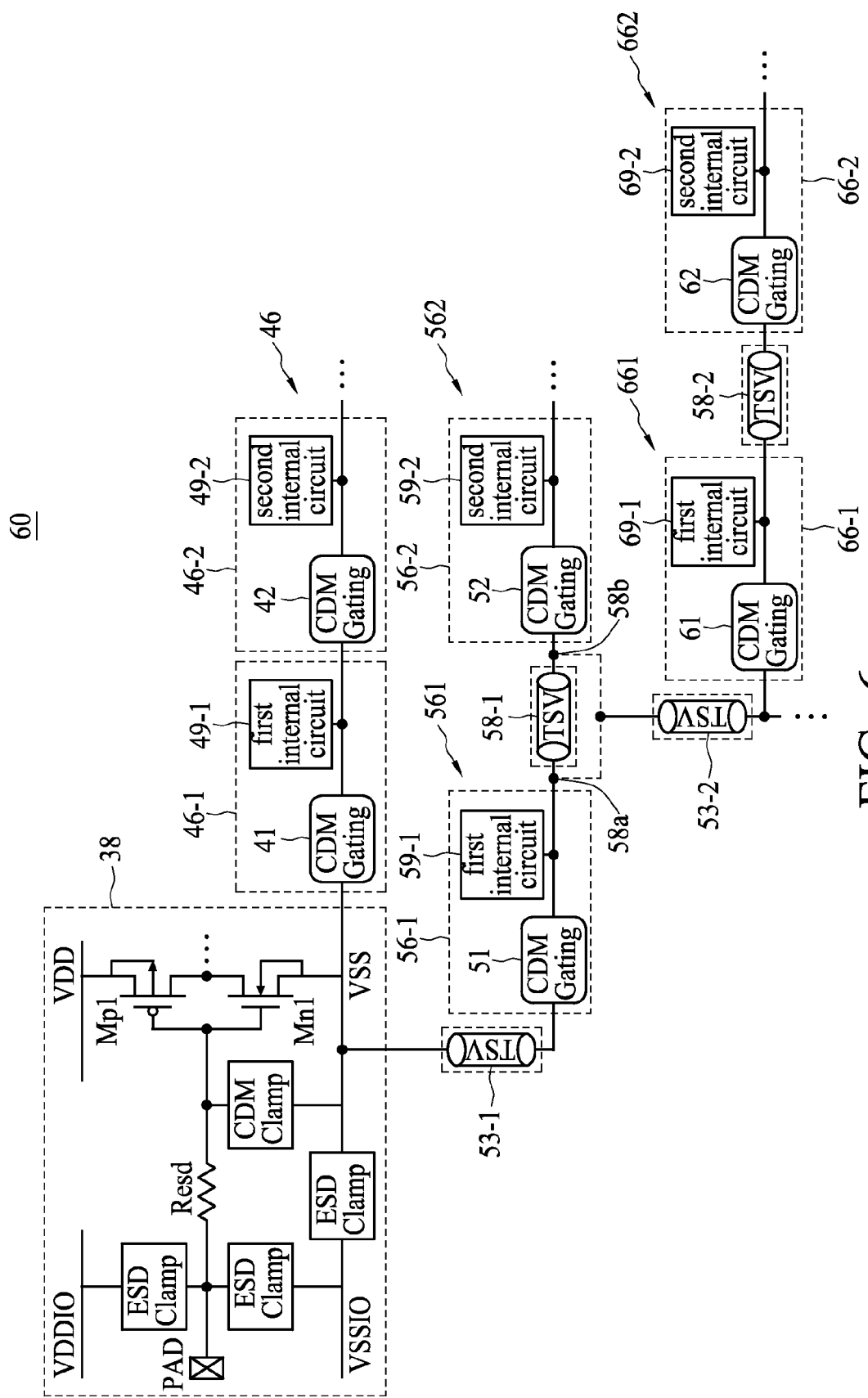
FIG. 6 is a schematic view of yet still another embodiment of the present disclosure showing an integrated circuit having CDM ESD protection.

FIG. 6 is a schematic view of yet still another embodiment of the present disclosure showing an integrated circuit 60 having CDM ESD protection. Referring to FIG. 6, the integrated circuit 60 is similar to the integrated circuit 50 illustrated in FIG. 5 except that, for example, the connection of the TSV 53-2. Specifically, unlike the TSV 53-2 illustrated in FIG. 5 that is connected in one end to the TSV 53-1, the TSV 53-2 illustrated in FIG. 6 is connected to one end of the TSV 58-1. Accordingly, in one embodiment, the TSV 53-2 is coupled to a first end 58a of the TSV 58-1 near the first internal circuit 59-1. That is, the stack 561 is coupled to the stack 562 through the TSV 58-1, and coupled to the stack 661 through the TSV 53-2.

In another embodiment, the TSV 53-2 is coupled to a second end 58b of the TSV 58-1 near the second CDM ESD protection device 52. That is, the stack 561 is coupled to the stack 562 through the TSV 58-1, and coupled to the stack 661 through the TSVs 58-1 and 53-2.

Figure 7:
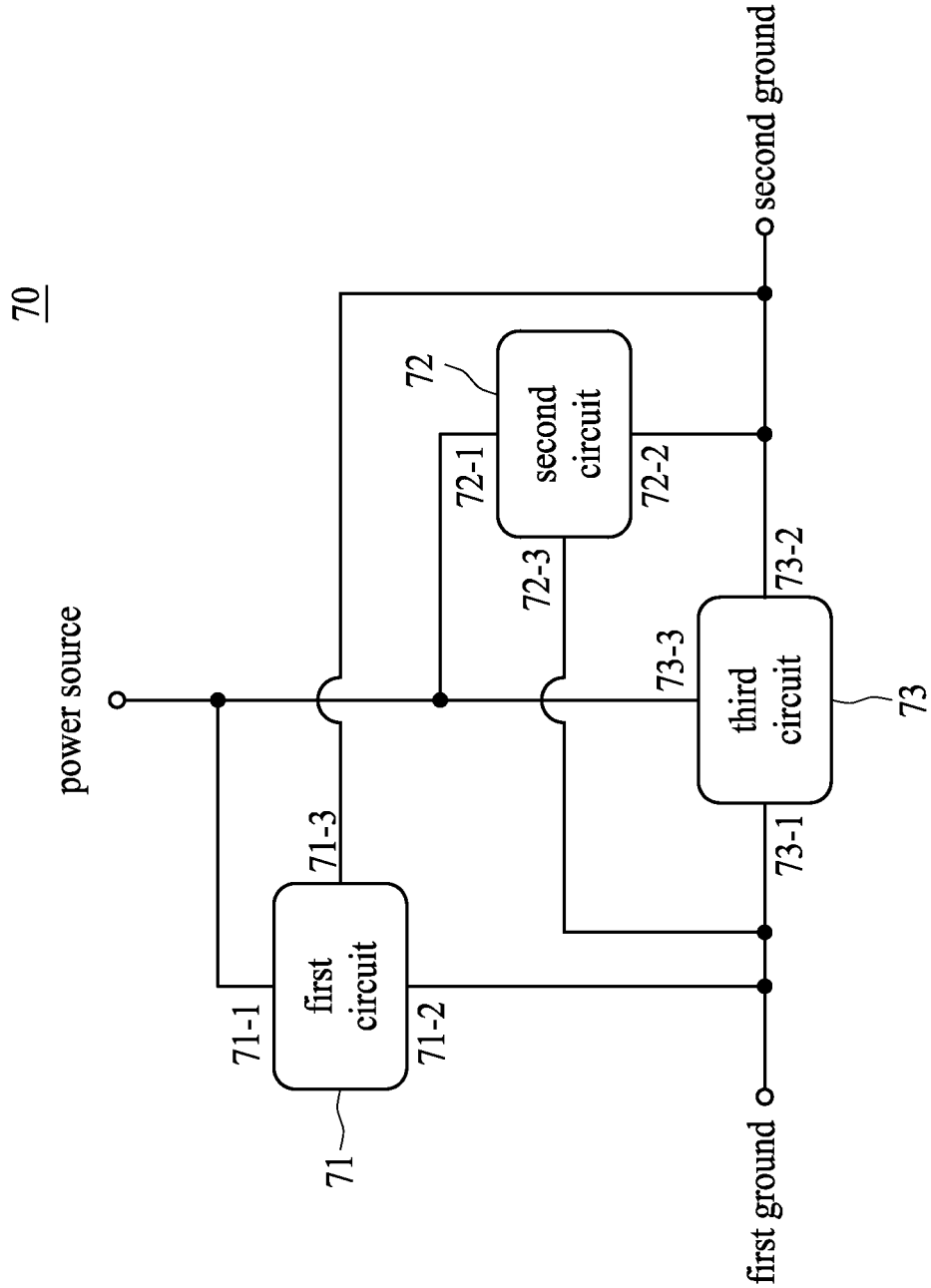
FIG. 7 is a schematic view of one embodiment of the present disclosure showing an integrated circuit of a CDM ESD protection device.

FIG. 7 is a schematic view of one embodiment of the present disclosure showing an integrated circuit 70 of a CDM ESD protection device. As shown in FIG. 7, the CDM ESD protection device 70 includes a first circuit 71, a second circuit 72 and a third circuit 73. The first circuit 71 includes a first terminal 71-1 coupled to a power source, a second terminal 71-2 coupled to a first ground, i.e., a first voltage reference, and a third terminal 71-3 coupled to a second ground, i.e., a second voltage reference. The first ground may include a ground level of an input/output circuit or an internal circuit. The second ground may include a ground level of another internal circuit.

The second circuit 72 includes a first terminal 72-1 coupled to the power source, a second terminal 72-2 coupled to the second ground, and a third terminal 72-3 coupled to the first ground.

The third circuit 73 includes a third terminal 73-3 coupled to the power source, a second terminal 73-2 coupled to the second ground, and a first terminal 73-1 coupled to the first ground.

The third circuit 73 may serve as a gateway circuit providing a conducting path that exhibits a low resistance during normal operation of the integrated circuit 70 to facilitate signal transmission, and providing a conducting voltage which is smaller than a gate breakdown voltage and smaller than a junction breakdown voltage of an internal component of the gateway circuit during a CDM ESD event so that when a cross voltage between two terminals of the gateway circuit is greater than the conducting voltage, electric charge accumulated in the internal circuit may be discharged via the gateway circuit.

In the present embodiment, the third circuit 73 may provide a dual-directional conducting path. When a cross voltage between the first terminal 73-1 and the second terminal 73-2 of the third circuit 73 is greater than the conducting voltage, accumulated electric charge may be discharged via the third circuit 73 to either the input/output circuit or the internal circuit. With the third circuit 73 having a conducting voltage, accumulated electric charge may be discharged over an extended period of time.

In operation, in one embodiment, when a CDM ESD event occurs, the first circuit 71 is turned on and the second circuit 72 is turned off, so the first terminal 73-1 and the third terminal 73-3 of the third circuit 73 are iso-electric voltage. In another embodiment, when a CDM ESD event occurs, the first circuit 71 is turned off and the second circuit 72 is turned on, so the second terminal 73-2 and the third terminal 73-3 of the third circuit 73 are iso-electric voltage.

Figure 8:
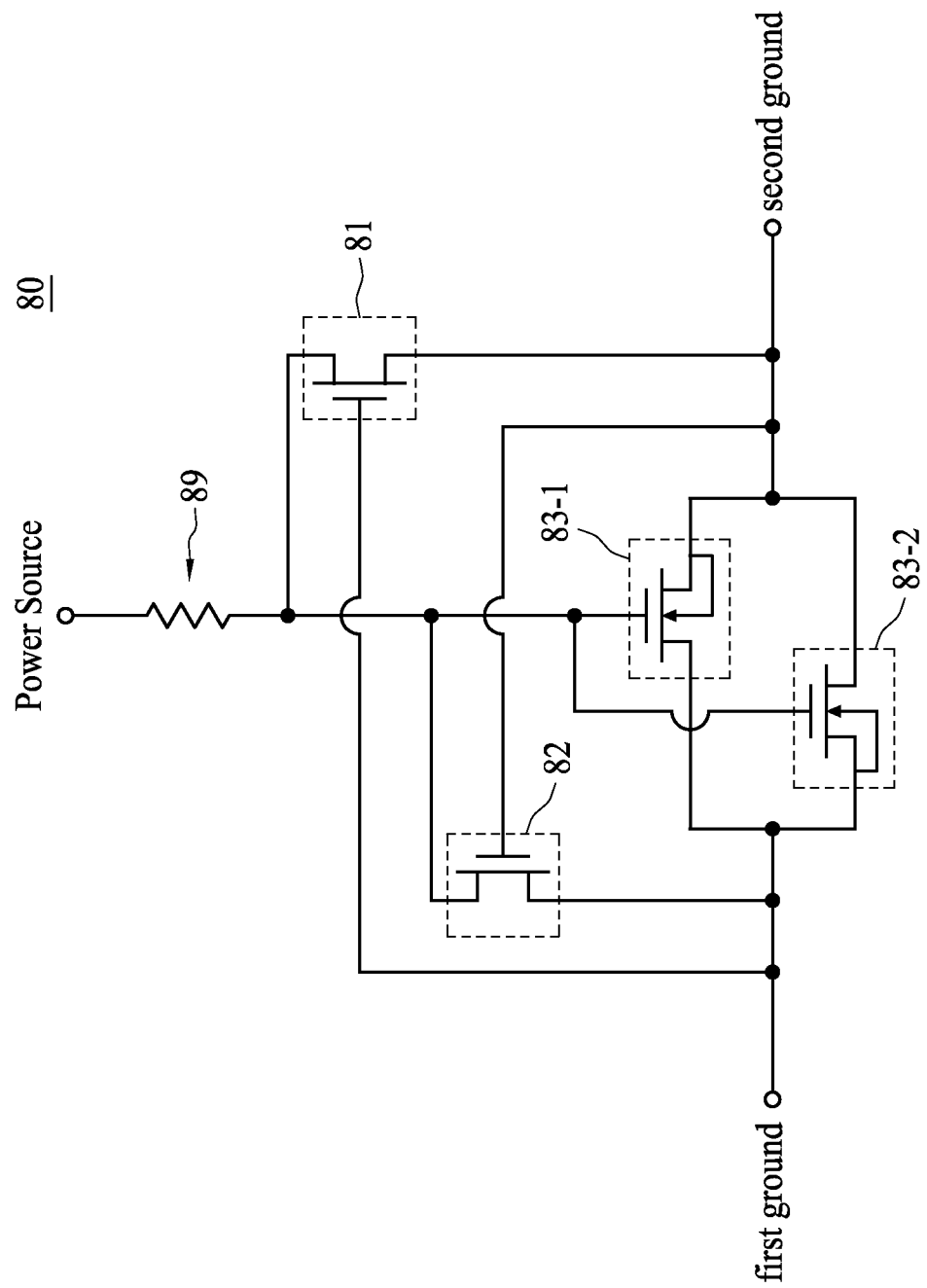
FIG. 8 is a schematic view of another embodiment of the present disclosure showing an integrated circuit of a CDM ESD protection device.

FIG. 8 is a schematic view of another embodiment of the present disclosure showing an integrated circuit 80 of a CDM ESD protection device. As shown in FIG. 8, the CDM ESD protection device 80 includes a first transistor 81, a second transistor 82, third transistors 83-1 and 83-2, and a resistor 89.

The first transistor 81 includes a drain terminal coupled to a power source via the resistor 89, a gate terminal coupled to a first ground associated with an input/output circuit (not shown), and a source terminal coupled to a second ground associated with an internal circuit.

The second transistor 82 includes a drain terminal coupled to the power source via the resistor 89, a source terminal coupled to the first ground, and a gate terminal coupled to the second ground.

The third transistor 83-1 includes a gate terminal coupled to the power source via the resistor 89, a drain terminal coupled to the first ground, and a source terminal coupled to the second ground. Another third transistor 83-2 includes a gate terminal coupled to the power source via the resistor 89, a source terminal coupled to the first ground, and a drain terminal coupled to the second ground.

Each of the transistors 81, 82 83-1 and 83-2 includes an n-type metal-oxide-semiconductor (NMOS) transistor. Moreover, each of the third transistors 83-1 and 83-2 includes a parasitic diode which has a conducting voltage, for example, between approximately 0.6V to approximately 0.7V. The conducting voltage is smaller than the gate breakdown voltage and smaller than the junction breakdown voltage of the third transistors 83-1 and 83-2. Consequently, when a cross voltage between the drain (source) terminal and the source (drain) terminal of the third transistor 83-1 (83-2) is greater than the conducting voltage, electric charge accumulated in the internal circuit may be discharged via one of the third transistors 83-1 and 83-2.

During normal operation, the first transistor 81 and the second transistor 82 are turned off, and the third transistors 83-1 and 83-2 are turned on. Therefore, the CDM ESD protection device 80 provides a conducting path, between the first ground and the second ground, having a low resistance.

When a CDM ESD event occurs, the third transistors 83-1 and 83-2 are turned off, and the electric charge accumulated in the internal circuit may be discharged to the input/output circuit via the parasitic diodes of the third transistors 83-1 and 83-2. The parasitic diode has a conducting voltage, for example, between approximately 0.6V to approximately 0.7V. When a potential difference between the first ground and the second ground becomes equal to or greater than the conducting voltage, the accumulated electric charge will be discharged via the parasitic diode.

Figure 9:
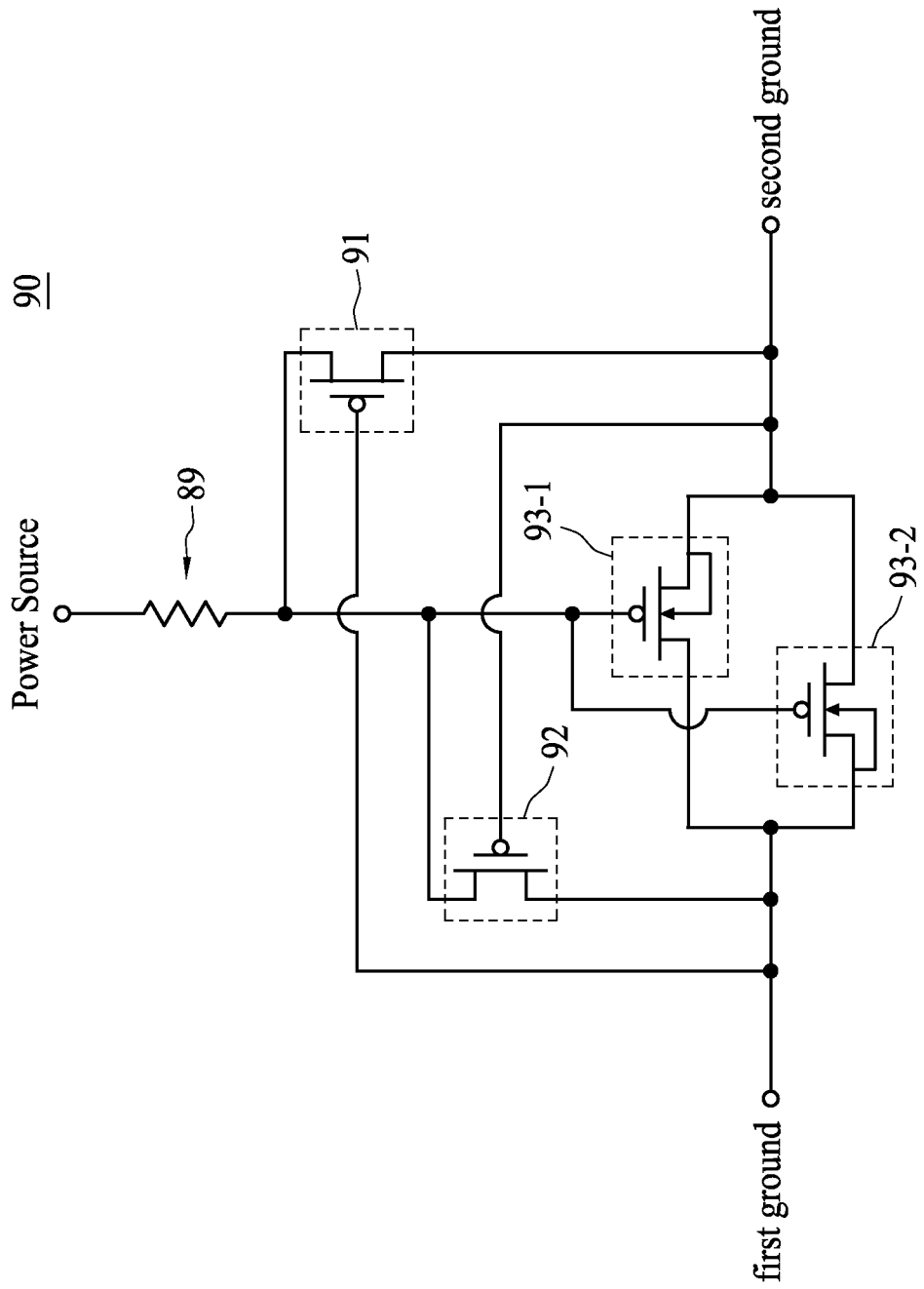
FIG. 9 is a schematic view of still another embodiment of the present disclosure showing an integrated circuit of a CDM ESD protection device.

FIG. 9 is a schematic view of still another embodiment of the present disclosure showing an integrated circuit 90 of a CDM ESD protection device. Referring to FIG. 9, the integrated circuit 90 is similar to the integrated circuit 80 illustrated in FIG. 8 except that, for example, each of transistors 91, 92, 93-1 and 93-2 is a p-type metal-oxide-semiconductor (PMOS) transistor.

The third circuit 73 described and illustrated with reference to FIG. 7, which may include the exemplary third transistors 83-1 and 83-2 illustrated in FIG. 8 and the exemplary third transistors 93-1 and 93-2 illustrated in FIG. 9, may be implemented in exemplary semiconductor structures illustrated in FIGS. 10 to 18 that will be described in detail below.

Figure 10:
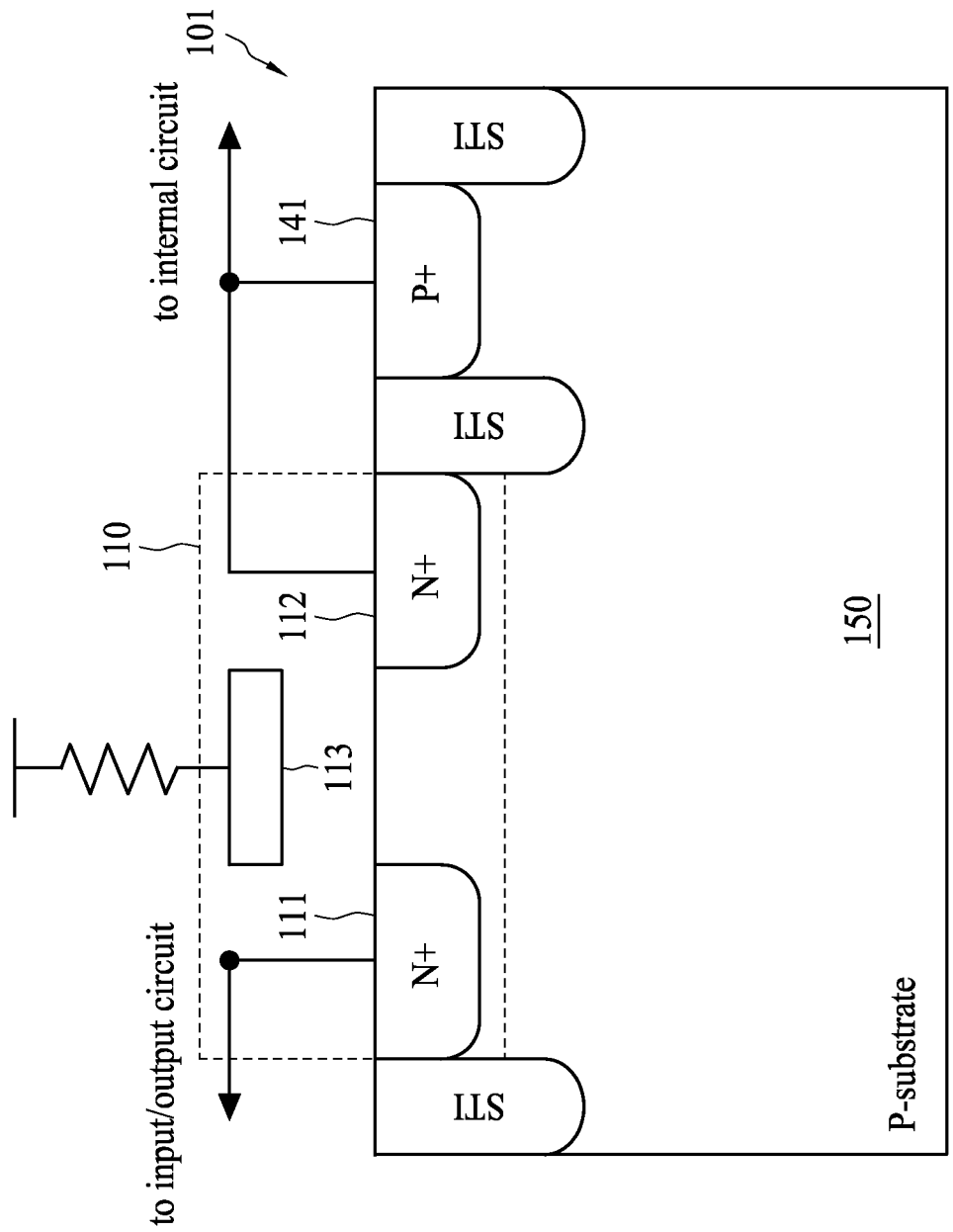
FIG. 10 is a cross-sectional schematic view of one embodiment of the present disclosure showing a semiconductor structure of a CDM ESD protection device.

FIG. 10 is a schematic cross-sectional view of one embodiment of the present disclosure showing a semiconductor structure 101 of a CDM ESD protection device. As shown in FIG. 10, the semiconductor structure 101 includes a substrate 150, a MOS transistor structure 110, and a heavily doped region 141.

The substrate 150 may include a silicon substrate lightly doped with a p-type dopant.

The MOS transistor structure 110 may include a gate region 113, a first heavily doped region 111 and a second heavily doped region 112. Each of the doped regions 111 and 112 is doped with a material of a first dopant type such as an n-type dopant, and may serve as a source or drain of the MOS transistor structure 110, depending on the voltage applied thereto.

The heavily doped region 141 is doped with a material of a second dopant type such as a p-type dopant, and is electrically isolated by an isolation structure such as a shallow trench isolation (STI). The second n-type doped region 112 and the p-type doped region 141 are electrically connected to a ground, i.e., a voltage reference or a ground level, of an internal circuit, and the first n-type doped region 111 is electrically connected to a ground, i.e., a voltage reference or a ground level, of an input/output circuit.

During a CDM ESD event, the input/output circuit, the first n-type doped region 111, the substrate 150, the second n-type doped region 112, and the internal circuit may form an electrical conducting path for discharging a current from the input/output circuit to the internal circuit. Furthermore, the input/output circuit, the first n-type doped region 111, the substrate 150, the p-type doped region 141 and the internal circuit may form another electrical conducting path for discharging a current from the internal circuit to the input/output circuit.

Figure 11:
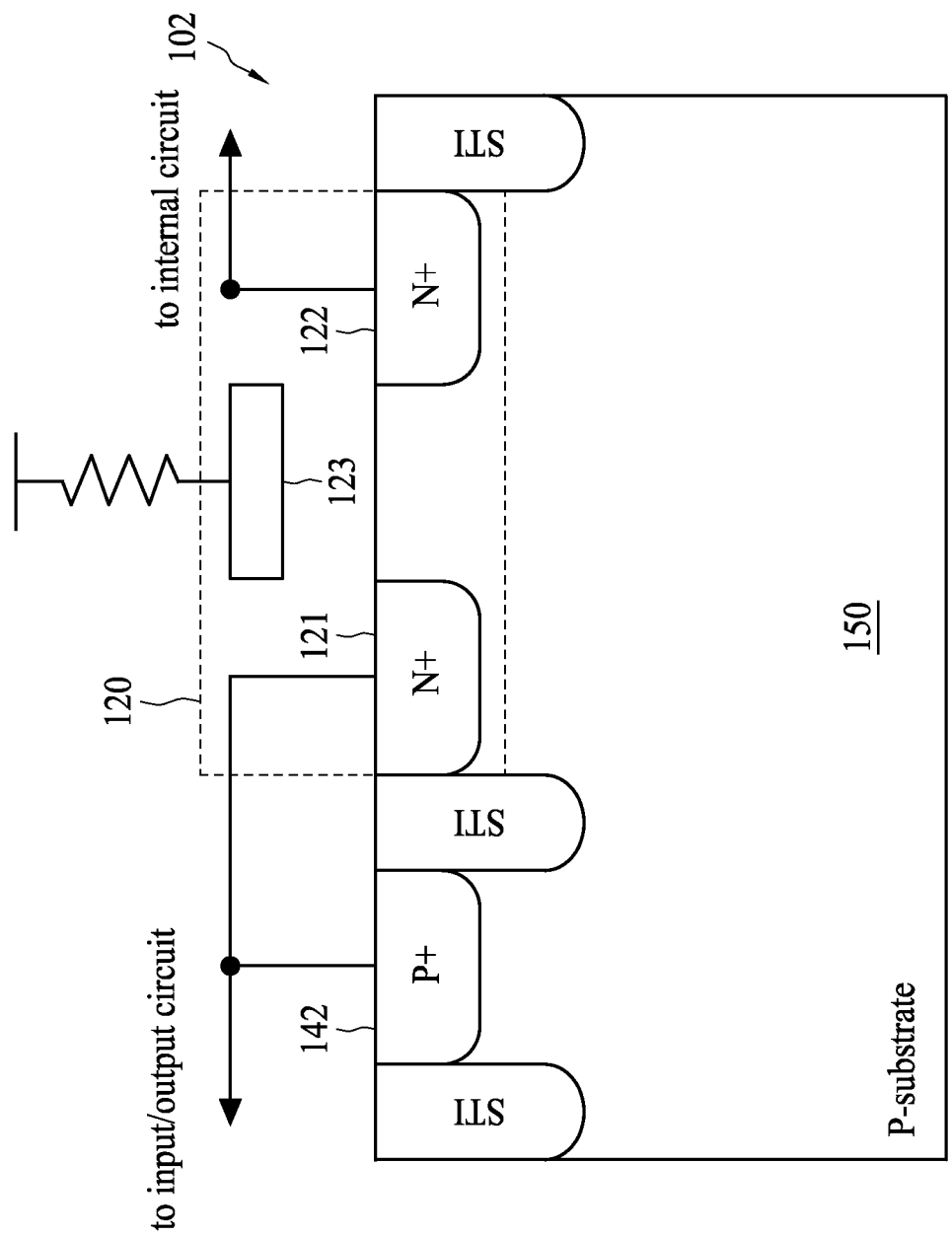
FIG. 11 is a cross-sectional schematic view of one embodiment of the present disclosure showing a semiconductor structure of a CDM ESD protection device.

FIG. 11 is a cross-sectional schematic view of one embodiment of the present disclosure showing a semiconductor structure 102 of a CDM ESD protection device. Referring to FIG. 11, the semiconductor structure 102 is similar to the semiconductor structure 101 illustrated in FIG. 10 except that, for example, a first n-type region 121 of a MOS transistor structure 120 is electrically connected to a p-type doped region 142 and an input/output circuit, and a second n-type doped region 122 is electrically connected to an internal circuit.

In operation, during a CDM ESD event, the input/output circuit, the first n-type doped region 121, the substrate 150, the second n-type doped region 122, and the internal circuit may form an electrical conducting path for discharging a current from the internal circuit to the input/output circuit. Furthermore, the input/output circuit, the p-type doped region 142, the substrate 150, the second n-type doped region 122 and the internal circuit may form another electrical conducting path for discharging a current from the input/output circuit to the internal circuit.

Figure 12:
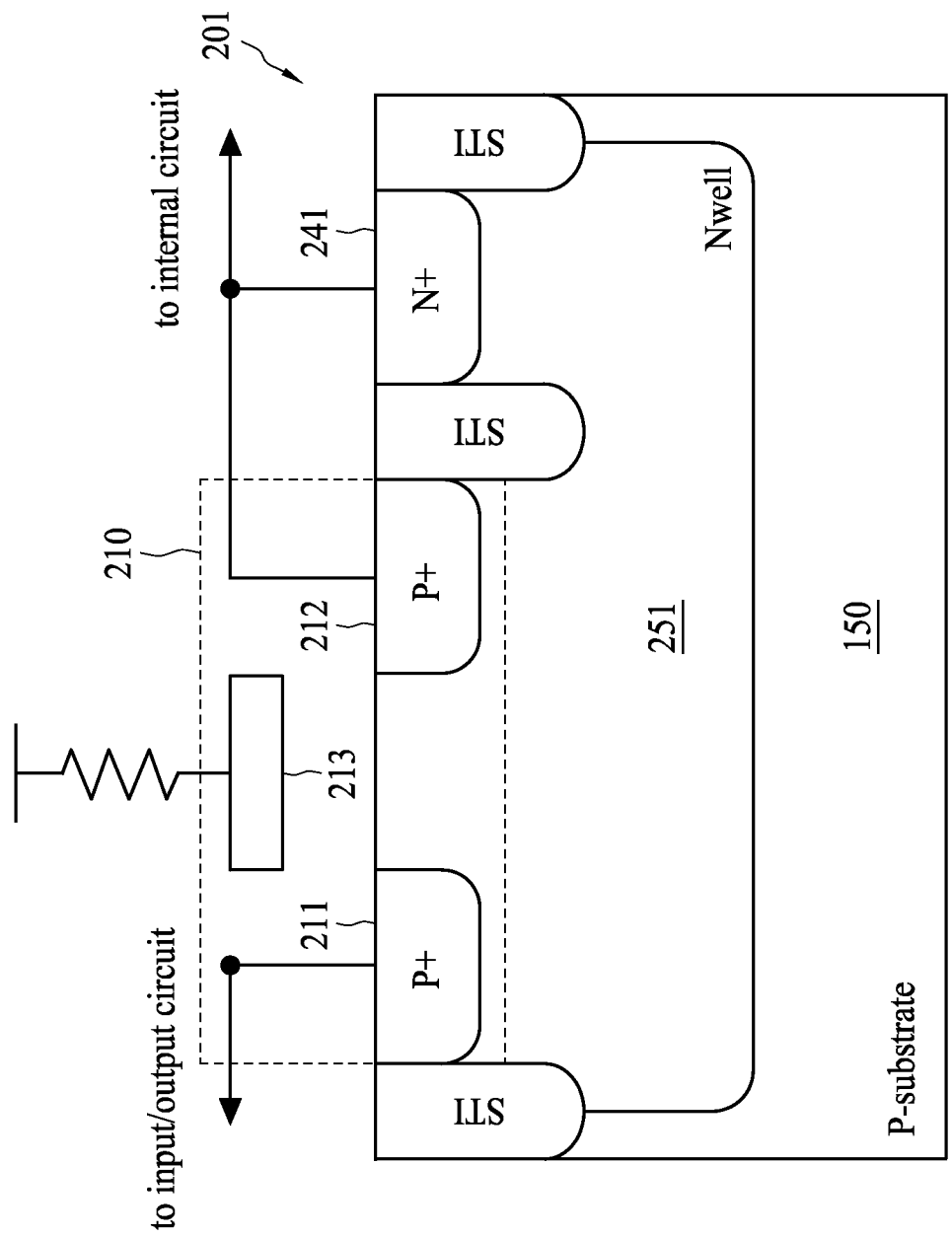
FIG. 12 is a cross-sectional schematic view of one embodiment of the present disclosure showing a semiconductor structure of a CDM ESD protection device.

FIG. 12 is a cross-sectional schematic view of one embodiment of the present disclosure showing a semiconductor structure 201 of a CDM ESD protection device. As shown in FIG. 12, the semiconductor structure 201 includes a semiconductor well region such as an N-well 251 in the substrate 150, a MOS transistor structure 210 in the N-well 251, and an n-type doped region 241 in the N-well 251. The MOS transistor structure 210 includes a gate region 213, a first p-type doped region 211 and a second p-type doped region 212. The second p-type doped region 212 is electrically connected to the n-type doped region 241 and an internal circuit. The first p-type doped region 211 is electrically connected to an input/output circuit.

In operation, during a CDM ESD event, the input/output circuit, the first p-type doped region 211, the N-well 251, the second p-type doped region 212 and the internal circuit may form an electrical conducting path for discharging a current from the internal circuit to the input/output circuit. Furthermore, the input/output circuit, the first p-type doped region 211, the N-well 251, the n-type doped region 241 and the internal circuit may form another electrical conducting path for discharging a current from the input/output circuit to the internal circuit.

Figure 13:
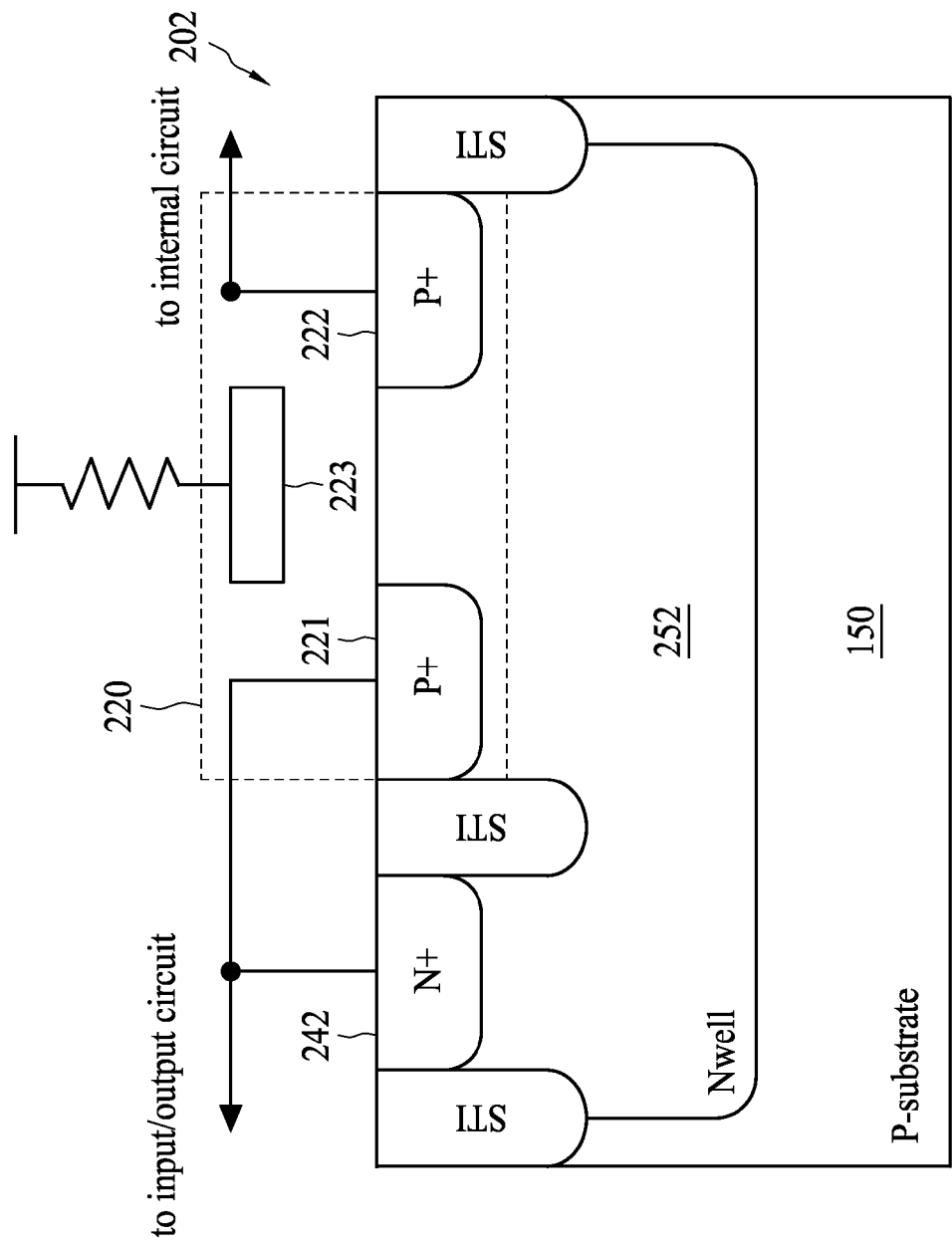
FIG. 13 is a cross-sectional schematic view of one embodiment of the present disclosure showing a semiconductor structure of a CDM ESD protection device.

FIG. 13 is a cross-sectional schematic view of one embodiment of the present disclosure showing a semiconductor structure 202 of a CDM ESD protection device. Referring to FIG. 13, the semiconductor structure 202 is similar to the semiconductor structure 201 illustrated in FIG. 12 except that, for example, a first p-type doped region 221 of a MOS transistor structure 220 in an N-well 252 is electrically connected to an n-type doped region 242 and an input/output circuit, and a second p-type doped region 222 is electrically connected to an internal circuit.

In operation, during a CDM ESD event, the input/output circuit, the first p-type doped region 221, the N-well 252, the second p-type doped region 222 and the internal circuit may form an electrical conducting path for discharging a current from the input/output circuit to the internal circuit. Moreover, the input/output circuit, the n-type doped region 242, the N-well 252, the second p-type doped region 222, and the internal circuit may form another electrical conducting path for discharging a current from the internal circuit to the input/output circuit.

Figure 14:
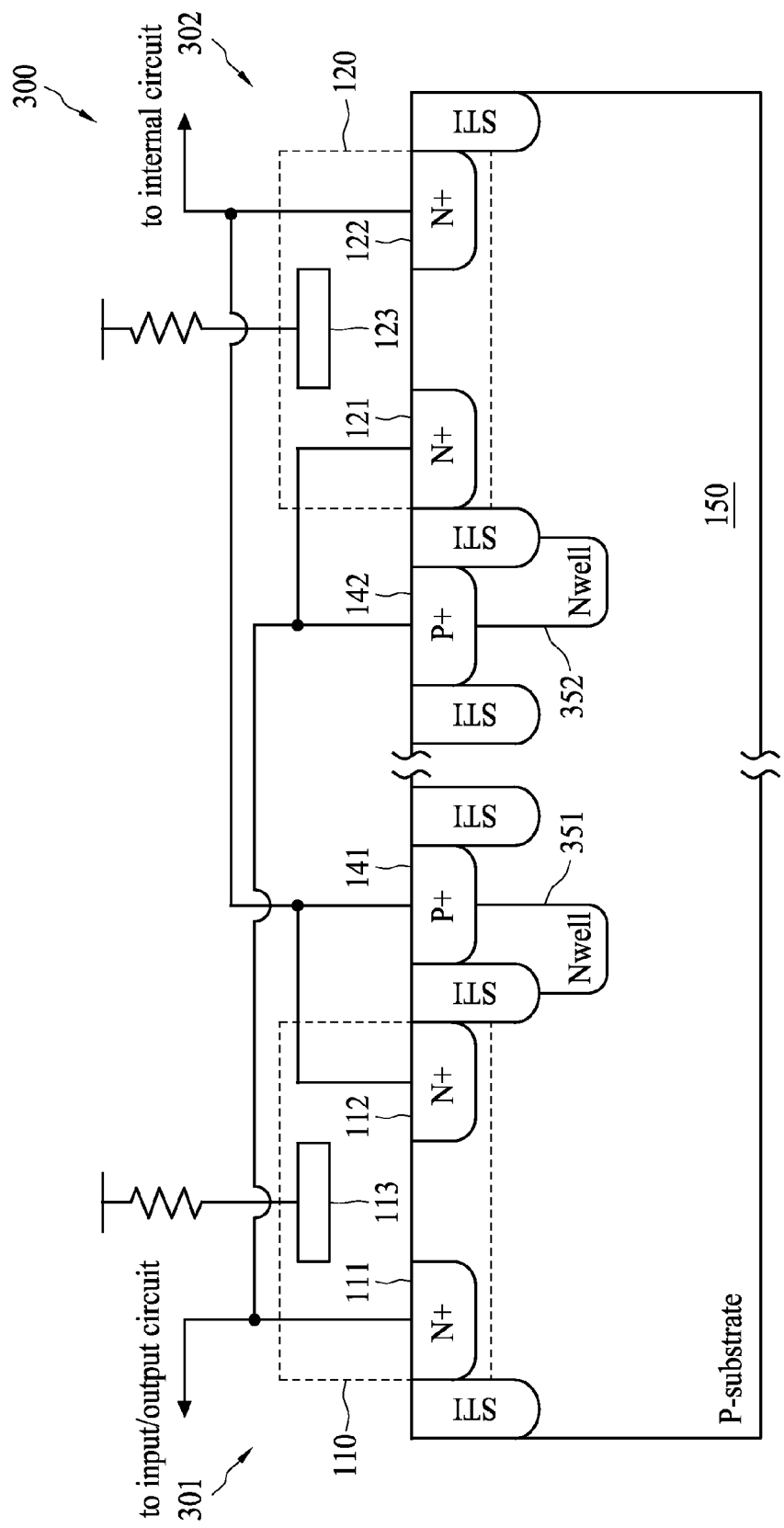
FIG. 14 is a cross-sectional schematic view of one embodiment of the present disclosure showing a semiconductor structure of a CDM ESD protection device.

FIG. 14 is a cross-sectional schematic view of one embodiment of the present disclosure showing a semiconductor structure 300 of a CDM ESD protection device. As shown in FIG. 14, the semiconductor structure 300 includes a first sub-structure 301 and a second sub-structure 302. The first sub-structure 301 is similar to the semiconductor structure 101 illustrated in FIG. 10 except that, for example, the p-type doped region 141 is partially formed in a first well region such as a first N-well region 351. Likewise, the second sub-structure 302 is similar to the semiconductor structure 102 illustrated in FIG. 11 except that, for example, the p-type doped region 142 is partially formed in a second well region such as a second N-well region 352.

In operation, during a CDM ESD event, the input/output circuit, the p-type doped region 142, the substrate 150, the second n-type doped region 122 of the MOS transistor structure 120, and the internal circuit may form an electrical conducting path for discharging a current from the input/output circuit to the internal circuit. Furthermore, the input/output circuit, the first n-type doped region 111 of the MOS transistor structure 110, the substrate 150, the p-type doped region 141, and the internal circuit may form another electrical conducting path for discharging a current from the internal circuit to the input/output circuit.

Figure 15:
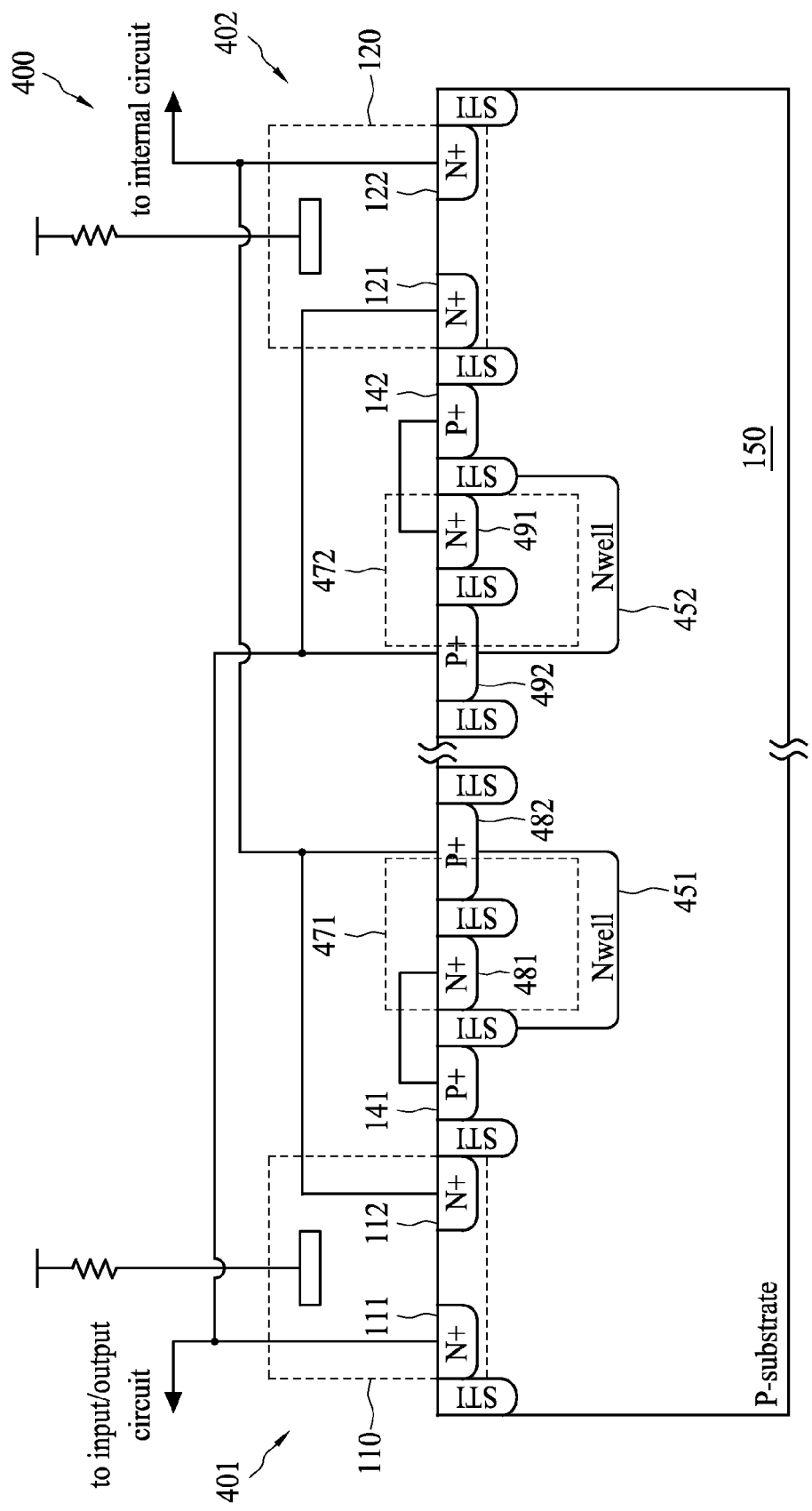
FIG. 15 is a cross-sectional schematic view of one embodiment of the present disclosure showing a semiconductor structure of a CDM ESD protection device.

FIG. 15 is a cross-sectional schematic view of one embodiment of the present disclosure showing a semiconductor structure 400 of a CDM ESD protection device. As shown in FIG. 15, the semiconductor structure 400 includes a first sub-structure 401 and a second sub-structure 402. The first sub-structure 401 includes, in addition to a device structure similar to the semiconductor structure 101 illustrated in FIG. 10, a first diode structure 471 that further includes a third n-type doped region 481 in a first N-well region 451, and a p-type doped region 482 partially in the first N-well region 451 and separated from the third n-type doped region 481 by STI.

The third n-type doped region 481 of the first diode structure 471 is in electrical connection with the p-type doped region 141. Moreover, the p-type doped region 482 of the first diode structure 471 is in electrical connection with the second n-type doped region 112 of the MOS transistor structure 110, and together coupled to the internal circuit.

Likewise, the second sub-structure 402 includes, in addition to a device structure similar to the semiconductor structure 102 illustrated in FIG. 11, a second diode structure 472 that further includes a third n-type doped region 491 in a second N-well region 452, and a p-type doped region 492 partially in the second N-well region 452 and separated from the third n-type doped region 491 by STI. The third n-type doped region 491 of the second diode structure 472 is in electrical connection with the p-type doped region 142. Moreover, the p-type doped region 492 of the second diode structure 472 is in electrical connection with the first n-type doped region 121 of the MOS transistor structure 120, and together coupled to the input/output circuit.

In operation, during a CDM ESD event, the input/output circuit, the p-type doped region 492, the second N-well 452, the third n-type doped region 491, the p-type doped region 142, the substrate 150, the second n-type doped region 122 of the MOS transistor structure 120 and the internal circuit may form an electrical conducting path for discharging a current from the input/output circuit to the internal circuit. Furthermore, the input/output circuit, the first n-type doped region 111 of the MOS transistor structure 110, the substrate 150, the p-type doped region 141, the third n-type doped region 481, the first N-well 451, the p-type doped region 482 and the internal circuit may form another electrical conducting path for discharging a current from the internal circuit to the input/output circuit.

Figure 16:
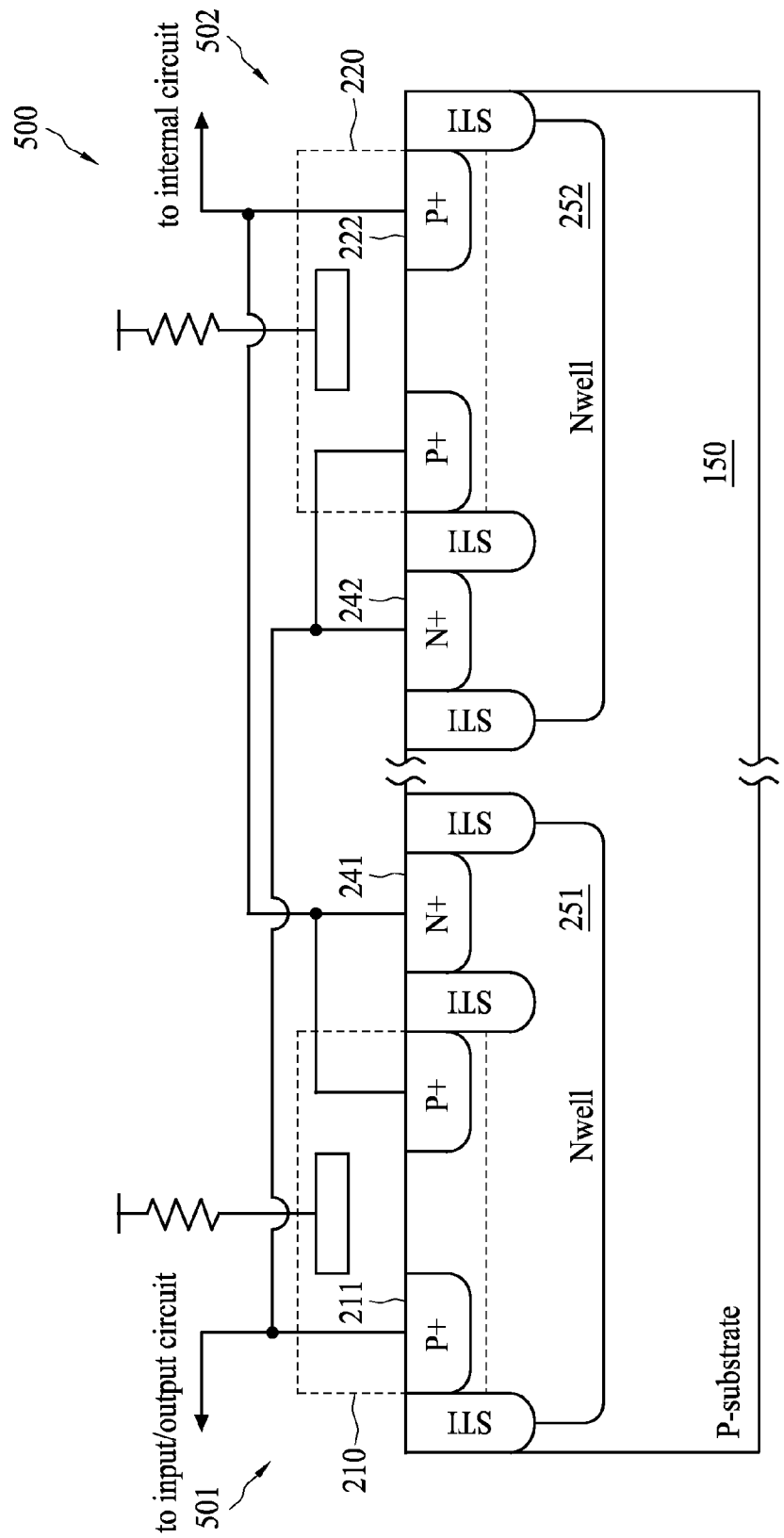
FIG. 16 is a cross-sectional schematic view of one embodiment of the present disclosure showing a semiconductor structure of a CDM ESD protection device.

FIG. 16 is a cross-sectional schematic view of one embodiment of the present disclosure showing a semiconductor structure 500 of a CDM ESD protection device. As shown in FIG. 16, the semiconductor structure 500 includes a first sub-structure 501 and a second sub-structure 502. The first sub-structure 501 is similar to the semiconductor structure 201 described and illustrated with reference to FIG. 12. Moreover, the second sub-structure 502 is similar to the semiconductor structure 202 described and illustrated with reference to FIG. 13.

In operation, during a CDM ESD event, the input/output circuit, the first p-type doped region 211 of the MOS transistor structure 210, the first N-well 251, the n-type doped region 241 and the internal circuit may form an electrical conducting path for discharging a current from the input/output circuit to the internal circuit. Moreover, the input/output circuit, the n-type doped region 242, the second N-well 252, the second p-type doped region 222 of the MOS transistor structure 220 and the internal circuit may form another electrical conducting path for discharging a current from the internal circuit to the input/output circuit.

Figure 17:
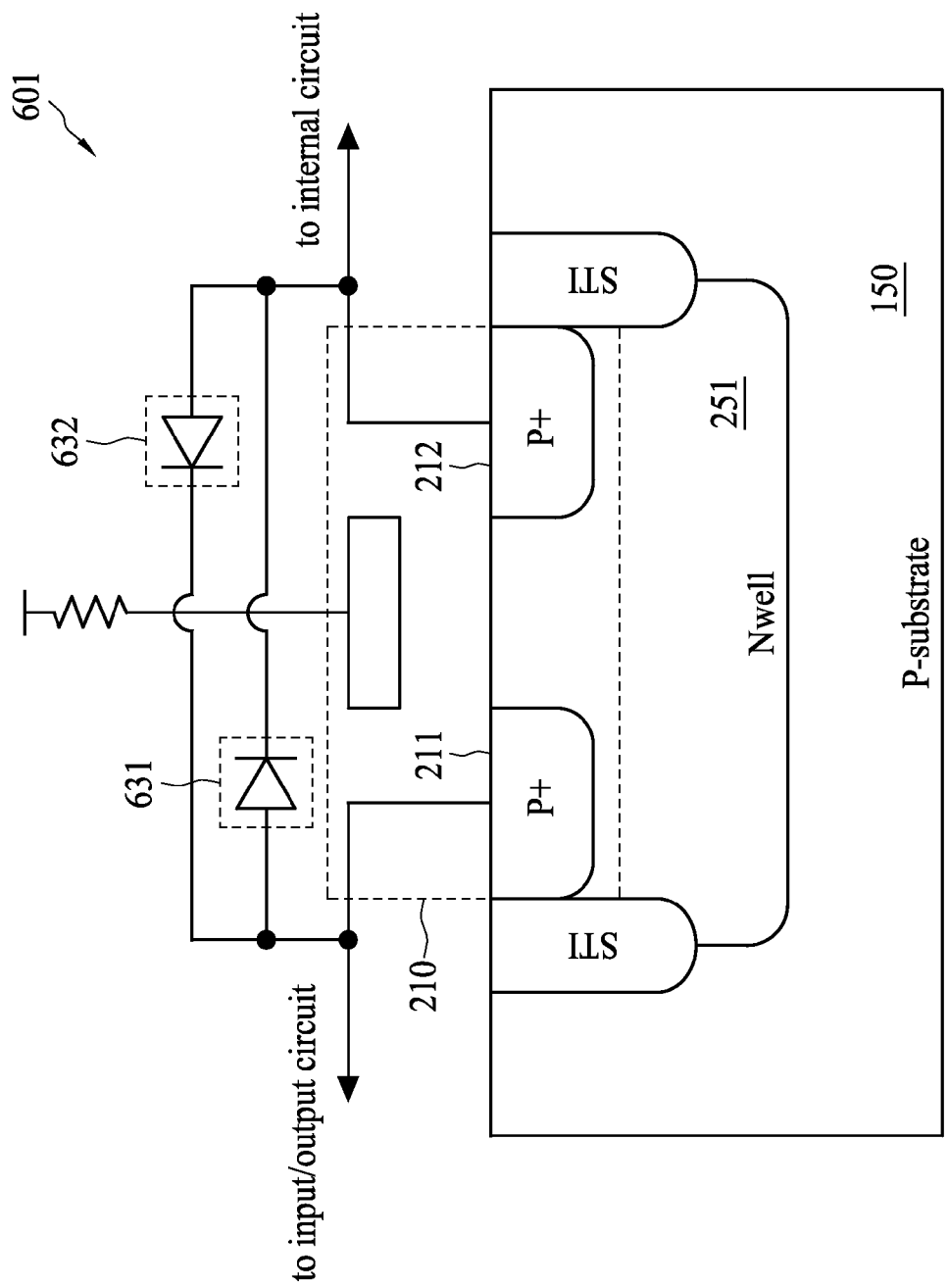
FIG. 17 is a cross-sectional schematic view of one embodiment of the present disclosure showing a semiconductor structure of a CDM ESD protection device.

FIG. 17 is a cross-sectional schematic view of one embodiment of the present disclosure showing a semiconductor structure 601 of a CDM ESD protection device. As shown in FIG. 17, the semiconductor structure 601 includes, in addition to the MOS transistor structure 210 in the N-well 251 as illustrated in FIG. 12, a first diode 631 and a second diode 632.

The first diode 631 has an anode that is electrically connected to the first p-type doped region 211 and an input/output circuit, and a cathode that is connected to the second p-type doped region 212 and an internal circuit. The second diode 632 has an anode that is electrically connected to the second p-type doped region 212 and the internal circuit, and a cathode that is electrically connected the first p-type doped region 211 and the input/output circuit.

In operation, during a CDM ESD event, the input/output circuit, the first diode 631, and the internal circuit may form an electrical conducting path for discharging a current from the input/output circuit to the internal circuit. Furthermore, the input/output circuit, the second diode 632, and the internal circuit may form another electrical conducting path for discharging a current from the internal circuit to the input/output circuit.

In the present embodiment, in each of the conducting paths, only one diode 631 or 632 is provided. In other embodiments, however, the first diode 631 may be connected in series with one or more diodes. Furthermore, the second diode 632 may also be connected in series with one or more diodes.

Figure 18:
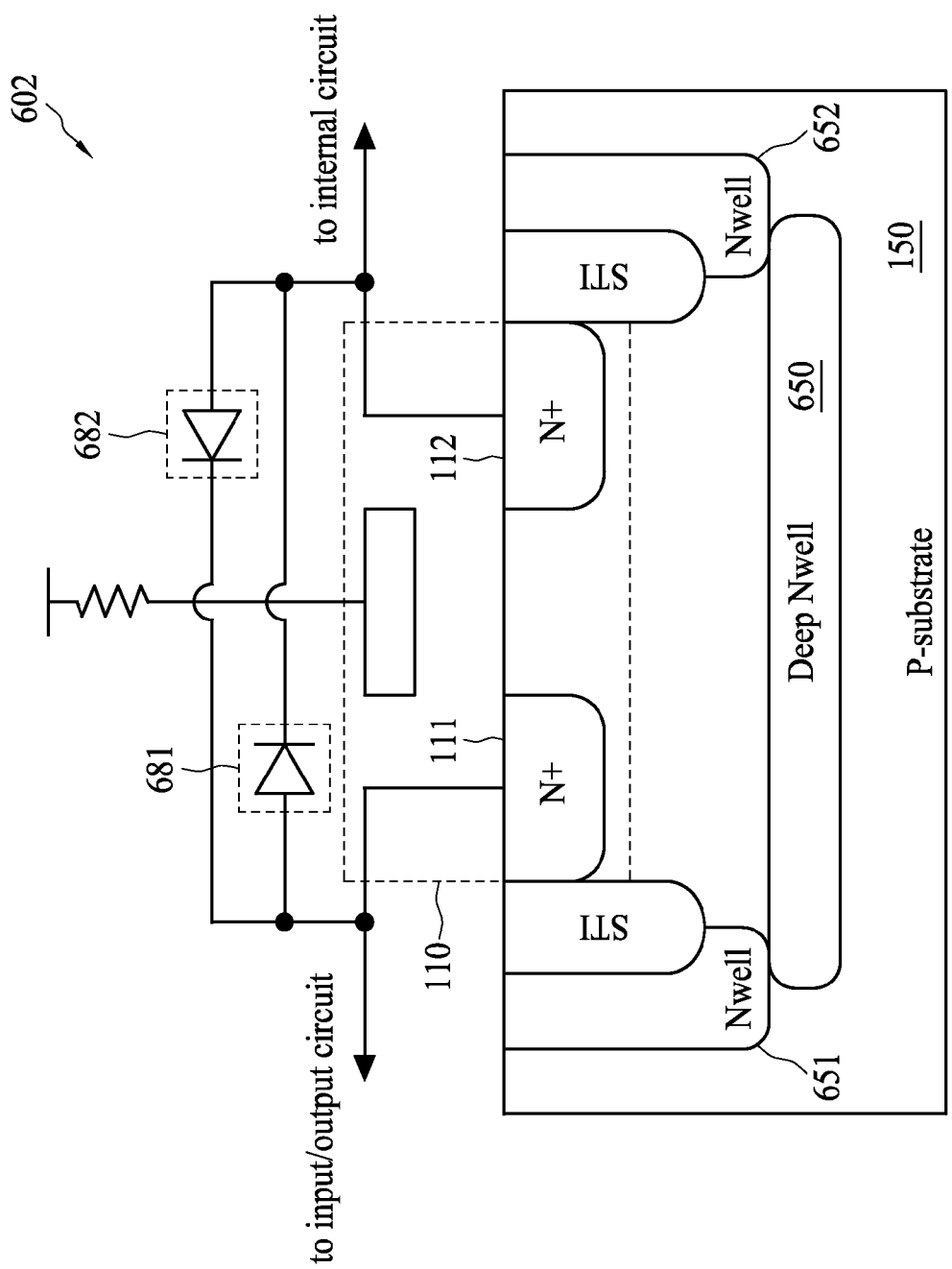
FIG. 18 is a cross-sectional schematic view of one embodiment of the present disclosure showing a semiconductor structure of a CDM ESD protection device.

FIG. 18 is a cross-sectional schematic view of one embodiment of the present disclosure showing a semiconductor structure 602 of a CDM ESD protection device. As shown in FIG. 18, the semiconductor structure 602 includes a first diode 681, a second diode 682, and a MOS transistor structure similar to the MOS transistor 110 described and illustrated with reference to FIG. 10. The semiconductor structure 602 may further include a well region such as a deep N-well region 650 below the MOS transistor structure 110, and N-well regions 651 and 652 that overlap STI structures.

The first diode 681 has an anode that is electrically connected to the first n-type doped region 111 and an input/output circuit, and a cathode that is connected to the second n-type doped region 112 and an internal circuit. The second diode 682 has an anode that is electrically connected to the second n-type doped region 112 and the internal circuit, and a cathode that is electrically connected to the first n-type doped region 111 and the input/output circuit.

In operation, during a CDM ESD event, the input/output circuit, the first diode 681 and the internal circuit may form an electrical conducting path for discharging a current from the input/output circuit to the internal circuit. Moreover, the input/output circuit, the second diode 682 and the internal circuit may form another electrical conducting path for discharging a current from the internal circuit to the input/output circuit.

In the present embodiment, in each of the conducting paths, only one diode 681 or 682 is provided. In other embodiments, however, the first diode 681 may be connected in series with one or more diodes. Furthermore, the second diode 682 may also be connected in series with one or more diodes.

Although the present disclosure and its objectives have been described in detail, it should be understood that various changes, substitutions and alterations can be made herein without departing from the spirit and scope of the disclosure as defined by the appended claims. For example, many of the processes discussed above can be implemented using different methodologies, replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An integrated circuit having a CDM (Charged-Device Model) ESD (Electrostatic Discharge) protection, comprising:
   an input/output circuit; and
   at least one ESD protection device coupled between at least one ground of the input/output circuit and a ground of at least one internal circuit, wherein the at least one ESD protection device includes a CDM ESD protection device, and the CDM ESD protection device includes a gateway circuit providing a conducting path having a low resistance during normal operation of the integrated circuit, and the gateway circuit has a conducting voltage during a CDM ESD event.

2. The integrated circuit of claim 1, wherein one of the at least one ESD protection device is coupled between a ground of one of the at least one internal circuit and a ground of another one of the at least one internal circuit.

3. The integrated circuit of claim 1, wherein the gateway circuit provides a conducting path to allow a dual-directional conduction during a CDM ESD event.

4. The integrated circuit of claim 1 further comprising:
   at least one TSV (Through Silicon Via) coupled between a ground of the at least one ground of the input/output circuit and the at least one ESD protection device.

5. The integrated circuit of claim 4, wherein one of the at least one TSV is coupled between a ground of one of the at least one internal circuit and one of the at least one ESD protection device.

6. The integrated circuit of claim 4, wherein one of the at least one TSV is coupled between another one of the at least one TSV and one of the at least one ESD protection device.

7. The integrated circuit of claim 6, wherein one of the at least one TSV is coupled between a ground of one of the at least one internal circuit and one of the at least one ESD protection device.

8. The integrated circuit of claim 6, wherein one of the at least one TSV is coupled to another one of the at least one TSV.

9. An integrated circuit having a CDM ESD protection, comprising:
   an input/output circuit;
   at least one ESD protection device; and
   at least one TSV, each being coupled between a ground of the input/output circuit and one of the at least one ESD protection device,
   wherein each of the at least one ESD protection device is coupled between one of the at least one TSV and a ground of one of at least one internal circuit, wherein the at least one ESD protection device includes a CDM ESD protection device, and the CDM ESD protection device includes a gateway circuit providing a conducting path having a low resistance during normal operation of the integrated circuit, and the gateway circuit has a conducting voltage during a CDM ESD event.

10. The integrated circuit of claim 9, wherein one of the at least one TSV is coupled between a ground of one of the at least one internal circuit and one of the at least one ESD protection device.

11. The integrated circuit of claim 9, wherein one of the at least one TSV is coupled between one of the at least one TSV and one of the at least one ESD protection device.

12. The integrated circuit of claim 11, wherein one of the at least one TSV is coupled between a ground of one of the at least one internal circuit and one of the at least one ESD protection device.

13. The integrated circuit of claim 11, wherein one of the at least one TSV is coupled to another one of the at least one TSV.

14. The integrated circuit of claim 9, wherein the gateway circuit provides a conducting path to allow a dual-directional conduction during a CDM ESD event.

15. An integrated circuit having a CDM ESD protection, comprising:
   a first circuit having a first terminal, a second terminal and a third terminal, wherein the first terminal of the first circuit is coupled to a power source, the second terminal of the first circuit is coupled to a first ground of an input/output circuit or an internal circuit, and the third terminal of the first circuit is coupled to a second ground of another internal circuit;

a second circuit having a first terminal, a second terminal and a third terminal, wherein the first terminal of the second circuit is coupled to the power source, the second terminal of the second circuit is coupled to the second ground and the third terminal of the second circuit is coupled to the first ground; and a third circuit having a first terminal, a second terminal and a third terminal, wherein the third terminal of the third circuit is coupled to the power source, the second terminal of the third circuit is coupled to the second ground and the first terminal of the third circuit is coupled to the first ground wherein the third circuit includes at least one switch, and the third circuit provides a conducting path having a low resistance during normal operation of the integrated circuit, and the third circuit has a conducting voltage during a CDM ESD event.

16. The integrated circuit of claim 15, wherein the third circuit provides a dual-conducting path to allow a dual-directional conduction during the CDM ESD event.

17. The integrated circuit of claim 15, wherein the first circuit and the second circuit are turned off during normal operation of the integrated circuit.

18. The integrated circuit of claim 15, wherein the first circuit is turned on, the second circuit is turned off, and the first terminal of the third circuit and the third terminal of the third circuit are iso-electric voltage during the CDM ESD event.

19. The integrated circuit of claim 15, wherein the second circuit is turned on, the first circuit is turned off, and the second terminal of the third circuit and the third terminal of the third circuit are iso-electric voltage during the CDM ESD event.

20. An integrated circuit having a CDM ESD protection, comprising:
  a substrate;
  at least one first transistor in the substrate including a first doped region of a first dopant type, and a second doped region of the first dopant type, wherein one of the first doped region of the first dopant type and the second doped region of the first dopant type is in electrical connection with a first ground of an input/output circuit or an internal circuit, and the other one of the first doped region of the first dopant type and the second doped region of the first dopant type is in electrical connection with a second ground of another internal circuit; and
  a first doped region of a second dopant type in the substrate in electrical connection with one of the first ground and the second ground;
  wherein the at least one first transistor is turned on to form a gateway circuit providing a conducting path having a low resistance during normal operation of the integrated circuit; and
  wherein the at least one first transistor is turned off and provides a parasitic dual-directional conduction and has a conducting voltage, during a CDM ESD event, for discharging accumulated charge.

21. The integrated circuit of claim 20 further comprising a well region in the substrate, wherein the first doped region of the first dopant type, the second doped region of the first dopant type and the first doped region of the second dopant type are disposed in the well region.

22. The integrated circuit of claim 20 further comprising:
  a second transistor in the substrate having the same structure as the at least one first transistor; and
  a second doped region of the second dopant type in the substrate in electrical connection with the other one of the first ground and the second ground.

23. The integrated circuit of claim 22 further comprising a first well region in the substrate, wherein the first doped region of the first dopant type and the second doped region of the first dopant type of the at least one first transistor, and the first doped region of the second dopant type are disposed in the first well region.

24. The integrated circuit of claim 23 further comprising a second well region in the substrate, wherein the first doped region of the first dopant type and the second doped region of the first dopant type of the second transistor, and the second doped region of the second dopant type are disposed in the second well region.

25. The integrated circuit of claim 20 further comprising:
  a first diode structure including a third doped region of the first dopant type and the first doped region of the second dopant type.

26. The integrated circuit of claim 25 further comprising a first well region, wherein the third doped region of the first dopant type is disposed in the first well region and the first doped region of the second dopant type is partially disposed in the first well region.

27. The integrated circuit of claim 26 further comprising a doped region of the second dopant type in electrical connection with the third doped region of the first dopant type.

28. The integrated circuit of claim 25 further comprising:
  a second transistor in the substrate having the same structure as the at least one first transistor; and
  a second diode structure including another third doped region of the first dopant type and a second doped region of the second dopant type, wherein the second doped region of the second dopant type is in electrical connection with the other one of the first ground and the second ground.

29. The integrated circuit of claim 28 further comprising a second well region, wherein the another third doped region of the first dopant type is disposed in the second well region and the second doped region of the second dopant type is partially disposed in the second well region.

30. The integrated circuit of claim 29 further comprising a doped region of the second dopant type in electrical connection with the another third doped region of the first dopant type.

* * * * *